(12) United States Patent
Nordstrom

(10) Patent No.: US 8,860,587 B2
(45) Date of Patent: Oct. 14, 2014

(54) INTERFACING CUSTOMERS WITH MOBILE VENDORS

(76) Inventor: Christopher Andrew Nordstrom, Boston, MA (US)

(*) Notice: Subject to any disclaimer, the term of this patent is extended or adjusted under 35 U.S.C. 154(b) by 129 days.

(21) Appl. No.: 13/557,554

(22) Filed: Jul. 25, 2012

(65) Prior Publication Data

US 2013/0027227 A1    Jan. 31, 2013

Related U.S. Application Data

(60) Provisional application No. 61/511,274, filed on Jul. 25, 2011.

(51) Int. Cl.
*G08G 1/123* (2006.01)
*G08G 1/00* (2006.01)
*G06Q 30/02* (2012.01)
*G01C 21/34* (2006.01)

(52) U.S. Cl.
CPC ............ *G08G 1/202* (2013.01); *G06Q 30/0261* (2013.01); *G01C 21/3438* (2013.01); *G06Q 30/0205* (2013.01)
USPC ........................ 340/990; 340/995.17; 340/996

(58) Field of Classification Search
USPC .......................... 340/990–994, 995.1, 995.11, 340/995.12–995.17, 995.19, 995.21, 340/995.22, 995.27, 996
See application file for complete search history.

(56) References Cited

U.S. PATENT DOCUMENTS

| | | | |
|---|---|---|---|
| 6,604,083 B1 | 8/2003 | Bailey | |
| 6,976,001 B1 | 12/2005 | Levanoni et al. | |
| 7,337,125 B2 | 2/2008 | Kraft et al. | |
| 7,376,584 B1* | 5/2008 | Weixel | 705/17 |
| 7,421,428 B2* | 9/2008 | Lunenfeld | 1/1 |
| 7,555,442 B1 | 6/2009 | Datta-Read et al. | |
| 7,729,931 B1 | 6/2010 | Tobin | |
| 7,870,126 B2 | 1/2011 | Lester et al. | |
| 7,991,638 B1 | 8/2011 | House et al. | |
| 2002/0123924 A1* | 9/2002 | Cruz | 705/10 |
| 2002/0169658 A1 | 11/2002 | Adler | |
| 2003/0033195 A1 | 2/2003 | Bruce et al. | |
| 2004/0010431 A1 | 1/2004 | Thomas et al. | |
| 2004/0199398 A1* | 10/2004 | Kubota | 705/1 |
| 2008/0154706 A1* | 6/2008 | Bruecken | 705/10 |
| 2009/0037251 A1* | 2/2009 | Larsen | 705/10 |

(Continued)

OTHER PUBLICATIONS

"New York Street Food" iPhone Application, published at least as early as Oct. 24, 2011, 11 pages.

(Continued)

*Primary Examiner* — Daniel Previl
(74) *Attorney, Agent, or Firm* — Withrow & Terranova, PLLC

(57) ABSTRACT

A mechanism for directing a vendor vehicle to an area in a region. A device receives a plurality of search requests from a plurality of corresponding user devices. Each search request includes search request data that includes a location identifier that identifies a location of the corresponding user device in the region at a time of the search request, and one or more user search criteria. The device identifies, based on the plurality of search requests and at least one subset-determination criterion, at least one subset of the plurality of user devices. The device determines at least one determined location within the region based on the corresponding locations of the user devices in the at least one subset. The device sends vehicle positioning information that identifies the at least one determined location to a vendor device associated with the vendor vehicle.

22 Claims, 12 Drawing Sheets

(56) References Cited

U.S. PATENT DOCUMENTS

| | | | |
|---|---|---|---|
| 2009/0088967 A1* | 4/2009 | Lerner et al. | ............... 701/208 |
| 2009/0187466 A1 | 7/2009 | Carter et al. | |
| 2011/0161167 A1 | 6/2011 | Jallapuram | |

OTHER PUBLICATIONS

"What is Roaming Hunger," Roaming Hunger, published at least as early as Oct. 24, 2011, 2 pages.
"Trux Map," www.foodtrucksmap.com, published at least as early as Oct. 24, 2011, 1 page.
"Sense Networks (MacroSense & Citysense Services)," published at least as early as Oct. 24, 2011, 3 pages.
"Street Food Vancouver," iPhone Application, published at least early as Oct. 24, 2011, 6 pages.
"Hotspots: The heat map of main events," Mobile Application by Waggener Edstrom Worldwide, published at least as early as Oct. 24, 2011, 2 pages.
"Wanna find the best food trucks in New York?," Thrillist, published at least as early as Oct. 24, 2011, 2 pages.
"Glossary—Location based services," www.scanlife.com/en/location-based-services, published at least as early as Oct. 3, 2012, 1 page.
Wissinger, C., "Mobile users have mixed feelings about location-based coupons, according to latest mobile survey," PRWeb, Oct. 5, 2011, 2 pages.
Saavedra, F., "Team nomad 'finding consumer' project proposal," published at least as early as Apr. 9, 2012, 2 pages.
"Don't miss a thing with the Mobile World Congress 'Heat Map,'" Google Mobile Ads Blog, Feb. 10, 2011, 2 pages.
Corey, D. "Street food vendors get a shot at primetime fame," May 26, 2011, 2 pages.

* cited by examiner

| | |
|---|---|
| VENDOR NAME | 56-1 |
| VENDOR IDENTIFIER | 56-2 |
| URL | 56-3 |
| ADDRESS | 56-4 |
| DEVICE NUMBER | 56-5 |
| DEVICE TYPE | 56-6 |
| PRODUCT DATA (PRODUCT TYPE, COSTS, COST CATEGORY, MENU) | 56-7 |
| SEARCH HISTORY | 56-8 |
| HOURS | 56-9 |
| COUPONS | 56-10 |
| LOCATION | 56-11 |
| LOCATION TIME | 56-12 |
| ROUTE | 56-13 |
| ALERT DATA (E.G., PRODUCT PREFERENCE, TIME WINDOW, PROXIMITY RADIUS) | 56-14 |
| EMAIL ADDRESS | 56-15 |
| IM NAME/SERVICE | 56-16 |

Rows 56-1 through 56-16 constitute the VENDOR PROFILE (34).

*FIG. 5*

| USER DEVICE | USER SEARCH CRITERIA | LOCATION | TIME OF SEARCH |
|---|---|---|---|
| 16-1 | MEXICAN | 38-1 | 11:23 AM |
| 16-2 | CHINESE | 38-2 | 11:32 AM |
| 16-3 | ITALIAN | 38-3 | 11:33 AM |
| 16-4 | SEAFOOD | 38-4 | 11:18 AM |
| 16-5 | ITALIAN | 38-5 | 11:45 AM |
| 16-6 | ITALIAN | 38-6 | 11:50 AM |
| 16-7 | ITALIAN | 38-7 | 11:49 AM |
| 16-8 | MOO GOO GAI PAN | 38-8 | 11:49 AM |
| 16-9 | ITALIAN | 38-9 | 11:24 AM |
| 16-N | BURRITO | 38-N | 11:25 AM |

*FIG. 7*

INTERFACING CUSTOMERS WITH MOBILE VENDORS

RELATED APPLICATIONS

This application claims the benefit of provisional patent application Ser. No. 61/511,274, filed Jul. 25, 2011, the disclosure of which is hereby incorporated herein by reference in its entirety.

FIELD OF THE DISCLOSURE

The present disclosure relates to mobile vendors, and in particular to mechanisms for interfacing customers with mobile vendors.

BACKGROUND

In a conventional fixed-location retail environment, when a customer is ready to make a purchase, the customer travels to a retail location of a vendor and purchases a product. Other than ensuring that the purchase is made during business hours, the customer need not worry about timing or location, because the vendor location does not change.

Mobile businesses are increasing in popularity. Unlike conventional fixed-location retail businesses, time and location are relatively important in a transaction involving a customer and a mobile vendor. Ideally, a mobile vendor wants to position their vehicle or vehicles where customers are located at the time the customers desire to purchase a product. Similarly, customers want the mobile vendor's vehicles positioned near them at the time they want to purchase a product from the mobile vendor. Accordingly, there is a need for mechanisms that aid in aligning customers' needs with mobile vendor locations.

SUMMARY

The present disclosure, among other features, relates to mechanisms for aligning customers needs with mobile vendors. In one embodiment, a plurality of search requests from a plurality of corresponding user devices in a region is received, by, for example, a device associated with a service provider. Each search request comprises search request data that includes a location identifier that identifies a location of the corresponding user device in the region, and one or more user search criteria. User search criteria may comprise, for example, a product type. In a mobile restaurant context, user search criteria may comprise, for example, a particular type of food.

The device identifies, based on the one or more user search criteria of the plurality of search requests and at least one subset-determination criteria, a subset of the plurality of user devices. For example, the device may identify a subset of user devices from which search requests for a particular type of food were received. The device determines at least one determined location within the region based on the corresponding locations of the user devices in the subset. The device sends vehicle positioning information that identifies the determined location to a vendor device associated with a vendor vehicle.

In one embodiment, the vendor vehicle may then use the vehicle positioning information to position the vendor vehicle at the determined location, such that the vendor vehicle is now in proximity to the users of the user devices in the subset. In one embodiment the device determines, based on the locations of the user devices in the subset, a preferred determined location that is located about equidistant to each location of the user devices in the subset, and sends the preferred determined location to the vendor device.

In one embodiment, the device may send the vehicle positioning information to one or more vendor devices in response to a vendor trigger. In particular, a vendor may define a vendor trigger that occurs, or triggers, at the time one or more vendor trigger criteria are met. Upon occurrence of the vendor trigger, a vendor trigger action is performed. For example, a vendor may define a vendor trigger wherein one or more vendor trigger criteria identify a particular user device density and a particular product type. The vendor trigger may define the vendor trigger action to comprise generating and sending the vehicle positioning information to the vendor device upon the occurrence of the vendor trigger.

The device may, alternatively, send the vehicle positioning information to the vendor device in response to a vehicle positioning information request for such information from the vendor device.

In one embodiment, the device may send information to a user device based on a user trigger. A user may define a user trigger that occurs, or triggers, at the time one or more user trigger criteria are met. Upon occurrence of the user trigger, a user trigger action is performed. For example, a user may define a user trigger wherein the user trigger criteria identify a particular product type, a particular time frame, and a particular distance from the user device associated with the user. The user may define the user trigger action to comprise the generation and sending, to the user device, of a message that identifies the location and identification of the vendor vehicle upon the occurrence of the user trigger.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 5 is a block diagram illustrating data maintained in a vendor profile, according to one embodiment;

FIG. 7 is a table that identifies search requests received from user devices by a server over a period of time, according to one embodiment;

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

The present disclosure, among other features, relates to mechanisms for aligning customers needs with mobile vendors. For purposes of illustration, embodiments will be discussed in the context of mobile vendors whose product is food, such as mobile food trucks. However, the present disclosure is not limited to mobile food vendors, and has applicability to any mobile business, irrespective of the type of product sold.

Figure 1:
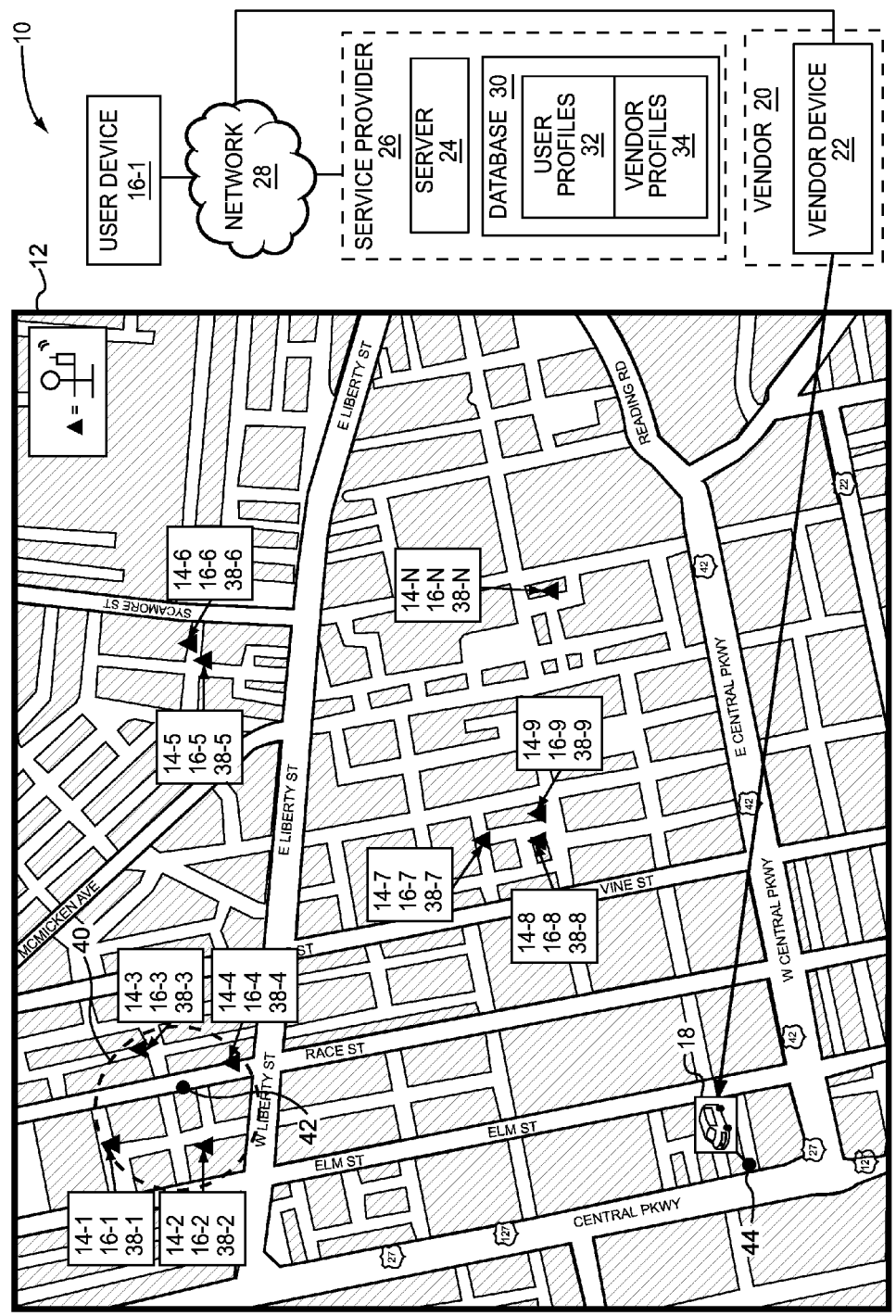
FIG. 1 is a diagram of a system in which embodiments of the present disclosure may be practiced, according to one embodiment.

FIG. 1 is a block diagram of an exemplary system 10 in which embodiments of the present disclosure may be practiced. The system 10 includes a region 12 in which a plurality of users 14-1-14-N are located (generally, users 14). Each user 14 is associated with, or corresponds to, a respective user device 16-1-16-N (generally, user devices 16). In FIG. 1, each user 14 and corresponding user device 16 is represented by a respective triangle. The user devices 16 may comprise any suitable processing device capable of implementing the functionality described herein. Non-limiting examples of a user device 16 include a smartphone, such as an Apple® iPhone®, or Android®-based smartphone; a laptop computer; a computer tablet, such as an Apple® iPad® or Android®-based tablet; or the like.

One or more vendor vehicles 18 may be located in the region 12, or located within driving proximity of the region 12. The vendor vehicles 18 may be associated with a same vendor 20, or different vendors 20. The vendor vehicle 18 has an associated vendor device 22. The vendor device 22 may be in the vendor vehicle 18, or may be located in a place of business, such as a home office, associated with a vendor 20. The vendor device 22 may also comprise any suitable processing device capable of implementing the functionality described herein. Non-limiting examples of the vendor device 22 include a smartphone, such as an Apple® iPhone®, or Android®-based smartphone; a laptop or desktop computer; a computer tablet, such as an Apple® iPad®, or Android®-based tablet; or the like.

The user devices 16 communicate with a server 24 associated with a service provider 26, via, for example, one or more networks 28. The network 28 may comprise, for example, a wireless network, a cellular network, a wired network, or any combination of the above that enable communications between the server 24 and the user devices 16. While for purposes of illustration only the user device 16-1 is illustrated in block form and as being communicatively coupled to the service provider 26 via the network 28, each user device 16 would be similarly communicatively coupled to the service provider 26 via the network 28.

In one embodiment, each user 14 may have a subscriber or member relationship with the service provider 26, and data regarding each user 14 may be maintained in a database 30 accessible by the server 24. Such data may be maintained, for example, in the form of a user profile 32. Thus, the database 30 may store a user profile 32 for each user 14, which may comprise data associated with each user 14, as well as the user device 16 that is associated with, or corresponds to, the respective user 14.

Similarly, each vendor 20 may have a subscriber or member relationship with the service provider 26, and data regarding each vendor 20 may be maintained in the database 30 accessible by the server 24. Such data may be maintained, for example, in the form of a vendor profile 34. Thus, the database 30 may store a vendor profile 34 for each vendor 20, which may comprise data associated with each vendor 20, as well as the vendor device 22 that is associated with, or corresponds to, the respective vendor 20.

In one embodiment, functionality described herein with respect to the user devices 16 may be facilitated by or in part implemented by an application module that executes on a respective user device 16. Such application module may be pre-loaded on the user device 16 at the time the user device 16 is sold to the corresponding user 14, subsequently downloaded to the user device 16 after the purchase thereof, or may comprise a web-based application that is provided to the user device 16 by the server 24 over the network 28 in response to receipt, for example, of a request from the user device 16. In other embodiments, the application module may comprise one or more electronic circuits, such as a field-programmable gate array (FPGA), application-specific integrated circuit (ASIC), or other circuitry, designed to implement the functionality described herein.

Figure 2:
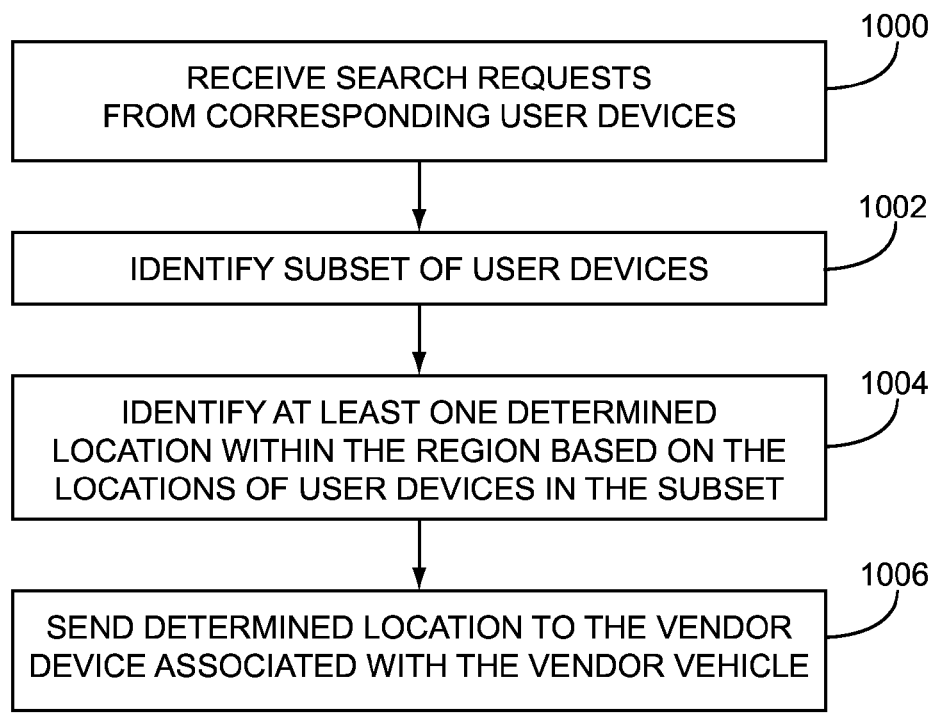
FIG. 2 is a flowchart of a process, according to one embodiment.

FIG. 2 is a flowchart of an exemplary process according to one embodiment. FIG. 2 will be discussed in conjunction with FIG. 1. The server 24 receives, over a period of time, search requests from one or more of the user devices 16 (FIG. 2, block 1000). The search requests comprise search request data that includes a location identifier that identifies a location 38-1-38-N (generally, locations 38) of a corresponding user device 16 from which the respective search request was received, and one or more user search criteria. The location identifiers may comprise any suitable information that precisely or approximately identifies the respective location 38, such as a latitude and longitude value, a street address, or the like. The location 38 may be determined automatically by the corresponding user device 16 in any desired manner, including, for example, by use of a global positioning system (GPS) receiver of the user device 16. Alternatively, the respective user 14 may manually enter the location of the user device 16. The one or more user search criteria may identify, for example, a particular product of interest to the respective user 14. In the context of a mobile food service, non-limiting examples of the one or more user search criteria may comprise, for example, one or more of a particular food type or product genre, such as Italian, subs, pizza, hot dogs, hamburgers; a cost category, such as a dollar range, or a predetermined cost category such as inexpensive, moderate, expensive, or the like; or any other suitable criteria.

Based on the plurality of search requests and at least one subset-determination criterion associated with a vendor 20, the server 24 identifies a subset of the one or more user devices 16 (FIG. 2, block 1002). In particular, the subset of user devices 16 is identified by filtering the plurality of search requests by the at least one subset-determination criterion, such that the user devices 16 associated with the search requests which meet the at least one subset-determination criterion comprise the user devices 16 in the subset. As an example, assume that the server 24 receives, from each of the user devices 16-1-16-7, a search request that includes a user search criterion that identifies a food type of "hamburgers." Assume that the subset-determination criteria include those search requests which identify a food type of "hamburgers," and further identify a particular user device density criterion. The user device density criterion may be defined in any desired manner, such as a number of user devices 16 located within a particular distance of one another, a number of user devices 16 located within an area of a particular size, or the like.

Assume for purposes of illustration the identified user device density criterion of the subset-determination criteria is at least three user devices 16 within an area the size of a circle having a 100-yard radius. Also assume that the circle 40 defines an area having a 100-yard radius. Based on such subset-determination criteria, the server 24 identifies the subset of user devices 16-1-16-4, since the user devices 16-1-16-4 comprise at least three user devices 16 that are within an area the size of a circle having a 100-yard radius. User devices 16-5-16-7, in contrast, do not meet the user device density criterion of the subset-determination criteria, and thus are not part of the subset.

Based on the locations 38-1-38-4 of the user devices 16-1-16-4 in the subset, the server 24 identifies at least one determined location within the region 12 (FIG. 2, block 1004). The at least one determined location may be a precise location, identified, for example, by a specific address, a street intersection, or longitude and latitude coordinates, or the at least one determined location may be an area within the region 12. Assume that the subset-determination criteria are associated with the vendor 20. The server 24 sends vehicle positioning information that identifies the at least one determined location to the vendor device 22 via the network 28 (FIG. 2, block 1006). Assume that the determined location is identified as a particular address at the location 42. The determined location information may comprise simply a street address, or the determined location information may comprise, for example, a map of the region 12, or a portion thereof, that indicates, within the map, the location 42. The vehicle positioning information may also include directions from a current location 44 of the vendor vehicle 18 to the location 42.

In one embodiment, the at least one determined location may comprise an optimal, or preferred determined location with respect to the locations of the user devices 16 in the subset. For example, the server 24 may determine a preferred determined location that comprises a location that is located about equidistant to each location 38 of the user devices 16 in the subset, such as the location 42 in the circle 40. "About equidistant" means within 20% of being equidistant to each location 38 of the user devices 16 in the subset. The embodiments are not limited to the determination of a preferred determined location that comprises a location that is located about equidistant to each location 38, and other mechanisms for determining a preferred determined location may be used. For example, a preferred determined location may be a determined location that minimizes walking distance for the greatest number of users 14 in a particular area, or the like.

In one embodiment, the at least one determined location may be identified as an area of the region 12, such as the area bounded by the circle 40, or the smallest area that includes each location of the user devices 16 in the subset. For example, the vehicle positioning information may comprise a map of the region 12, or a portion thereof, that visually distinguishes the area bounded by the circle 40 differently from the other areas in the map. For example, the area bounded by the circle 40 may be illustrated in a different color, brightness, or contrast than the other areas, or a perimeter of the area bounded by the circle 40 may be identified on the map to visually distinguish such area from other areas on the map.

In one embodiment, sending the vehicle positioning information to the vendor device 22 may be in response to the receipt of a vehicle positioning information request from the vendor device 22 for such information. In particular, a user of the vendor device 22, such as an employee of the vendor 20, may enter a vehicle positioning information request that identifies the subset-determination criteria, such as those search requests received from user devices 16 that identify a food type of "hamburgers," and those search results that have a user device density of at least three user devices 16 within an area having a 100-yard radius. Upon receiving the vehicle positioning information request, the server 24 accesses search requests received from the user devices 16, and determines the subset of user devices 16 based on such search requests. The server 24 may filter the search requests by a certain time-frame, such as those received within the past 60 minutes. Such time-frame may also be part of the vehicle positioning information request.

In another embodiment, sending the vehicle positioning information to the vendor device 22 may be in response to a vendor trigger that identifies the subset-determination criteria, and identifies a vendor trigger action, such as the generation and sending of an e-mail containing the vehicle positioning information to the vendor device 22, upon the occurrence of the vendor trigger. In such situation, the server 24 sends the vehicle positioning information automatically, without input from the vendor device 22, upon the occurrence of the vendor trigger. Vendor triggers, as well as user triggers, will be discussed in greater detail herein.

Figure 3:
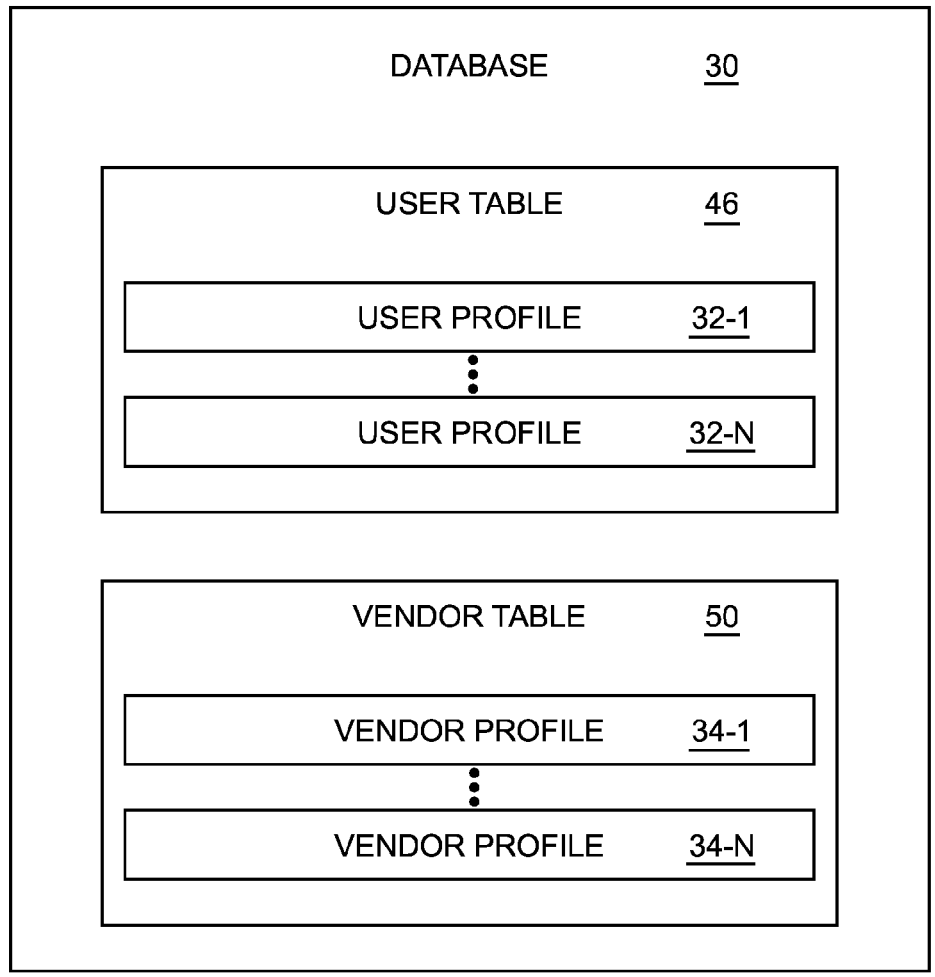
FIG. 3 is a block diagram of a database, according to one embodiment.

FIG. 3 is a block diagram of the database 30 according to one embodiment. The database 30 may comprise information about the users 14 and the vendors 20. A user table 46 comprises a plurality of user profiles 32-1-32-N (generally, user profiles 32), each of which corresponds to a respective user 14, and thus to the respective user device 16 associated with the user 14. Each user profile 32 comprises data, including user attributes, associated with the user 14. Certain information maintained in a user profile 32 may be configured by the user 14, pursuant to a user interface that executes on a processing device, such as the user device 16 that corresponds to the user 14, for example. Other information may be maintained and updated automatically by the server 24. Exemplary data that may be maintained in a user profile 32 will be discussed in greater detail herein.

A vendor table 50 comprises a plurality of vendor profiles 34-1-34-N (generally, vendor profiles 34), each of which corresponds to a respective vendor 20. Certain information maintained in a vendor profile 34 may be configured by the vendor 20, pursuant to a user interface that executes on a processing device, such as the vendor device 22 that corresponds to the vendor 20, for example. Other information may be maintained and updated automatically by the server 24. Exemplary data that may be maintained in a vendor profile 34 will be discussed in greater detail herein.

Figure 4:
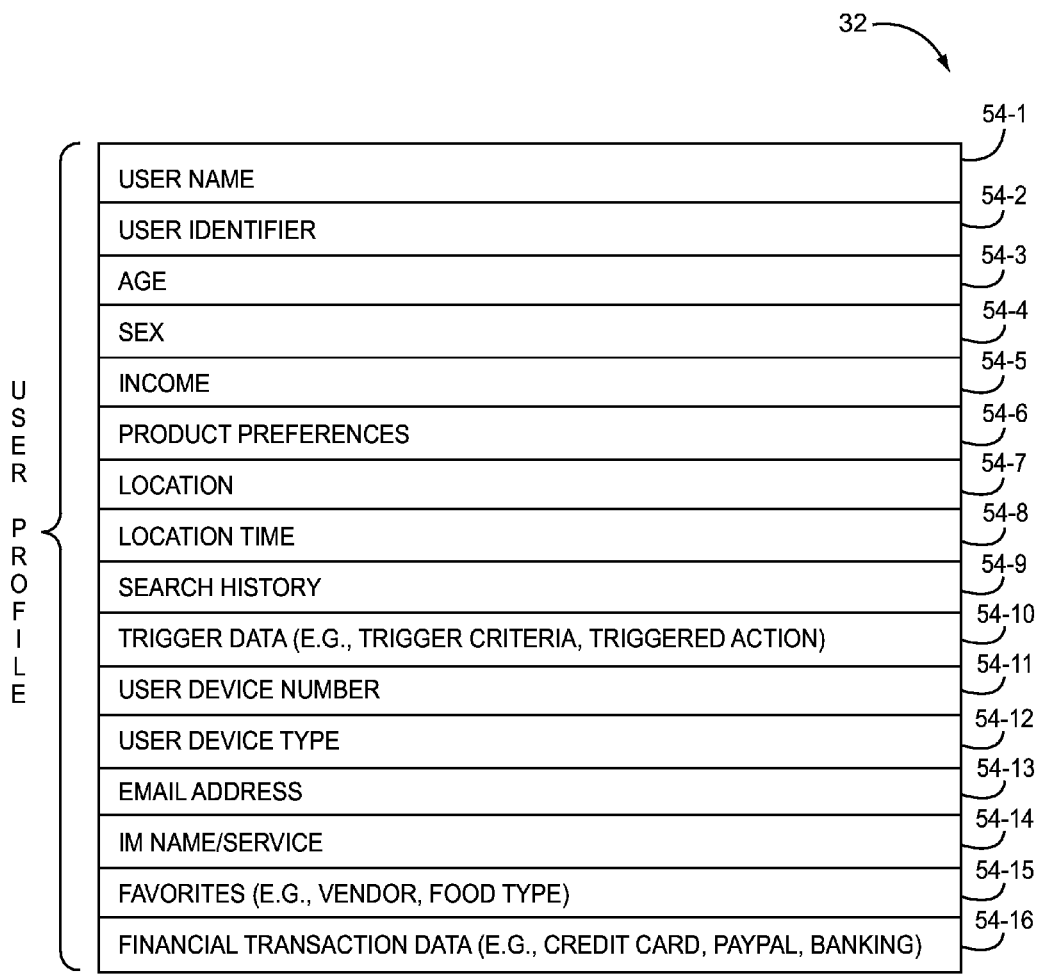
FIG. 4 is a block diagram illustrating data maintained in a user profile, according to one embodiment.

FIG. 4 is a block diagram illustrating data maintained in a user profile 32 according to one embodiment. The user profile 32 comprises a plurality of fields 54-1-54-16 that maintain data, such as user attributes, associated with a particular user 14. It will be appreciated that the fields 54-1-54-16 are merely examples, and that a user profile 32 may maintain any desired data regarding a user 14 which the service provider 26 finds useful in providing services. A field 54-1 maintains the user name of a respective user 14. A field 54-2 maintains a user identifier associated with the user 14. The user identifier may be used, for example, by the user 14 to log onto the service provided by the service provider 26. Fields 54-3-54-5 may maintain personal information regarding the user 14, such as age, sex, and annual income of the user 14, for example. A field 54-6 may be used to store product preferences of the user 14. A field 54-7 may maintain the current, or last known, location of the user 14, based on information received from the user device 16 associated with the user 14. For example, the user device 16 may, in one embodiment, periodically provide the server 24 with the current location of the user device 16, which may then be stored in the field 54-7. Additionally, the user device 16 preferably provides the location of the user device 16 each time the user 14 issues a search request to the server 24. Thus, the field 54-7 may maintain a relatively accurate current location of the user device 16. A field 54-8 may maintain the time of the last location update provided by the user device 16.

A field 54-9 may maintain the last search request received from the user device 16, or a history of search requests received from the user device 16. A field 54-10 may identify one or more user triggers, each of which may comprise one or more user trigger criteria, and an associated user trigger action that is performed by the server 24 upon the occurrence of the user trigger. A field 54-11 may identify a number associated with the corresponding user device 16, such as a telephone number, IP address, or other address via which the server 24 may communicate with the user device 16.

A field 54-12 may identify a particular device type, such as an IOS cell phone, computer tablet, Android®-based cell phone or tablet, or the like. A field 54-13 may identify an e-mail address associated with the user 14. A field 54-14 may identify an instant messaging (IM) user name and service via which the user 14 can be sent IM messages. A field 54-15 may maintain information about favorite vendors 20 of the user 14, favorite product types, such as food types, and the like. A field 54-16 may maintain financial transaction data such as credit card information, banking information, or the like, that the user 14 may utilize to pay for a purchase with a vendor 20. Much of this information may be provided, for example, by the respective user 14 during an initial user profile 32 set-up phase. Other information, including the fields 54-7-54-9, may be maintained in real-time by the server 24. The user 14 can preferably modify certain information as desired, such as the creation, modification, or deletion of user triggers.

FIG. 5 is a block diagram illustrating data maintained in a vendor profile 34 according to one embodiment. The vendor profile 34 comprises a plurality of fields 56-1-56-16 that maintain data, such as vendor attributes, associated with a particular vendor 20. It will be appreciated that the fields 56-1-56-16 are merely exemplary, and that a vendor profile 34 may maintain any desired data regarding a vendor 20 which the service provider 26 finds useful in providing services. A field 56-1 maintains the vendor name of a respective vendor 20. A field 56-2 maintains a vendor identifier of the respective vendor 20. The vendor identifier may be used, for example, by the vendor 20 to log onto the service provided by the service provider 26. A field 56-3 may maintain a uniform resource locator (URL) of a website associated with the vendor 20.

A field 56-4 may maintain a street address associated with the vendor 20. A field 56-5 may identify a device number associated with the corresponding vendor device 22, such as a telephone number, IP address, or other address via which the server 24 may communicate with the vendor device 22. A field 56-6 may identify a particular device type of the vendor device 22, such as an IOS cell phone, computer tablet, Android®-based cell phone or tablet, or the like. A field 56-7 may identify information about the products sold by the vendor 20, such as product type, costs, or a cost category such as inexpensive, moderate, or expensive. A field 56-8 may identify the last vehicle positioning information request received from the vendor device 22, or a history of vehicle positioning information requests received from the vendor device 22. A field 56-9 may identify hours during which the vendor 20 provides services. A field 56-10 may include coupon information that identifies coupons that may be sent to a user device 16 for use in purchasing a product from the vendor 20.

A field 56-11 may identify a current, or last known, location of the vendor device 22. As discussed above with regard to a user device 16, a vendor device 22 may, in one embodiment, periodically provide the server 24 with the current location of the vendor device 22, which may then be stored in the field 56-11. Additionally, the vendor device 22 preferably provides the location of the vendor device 22 each time the vendor device 22 issues a search request to the server 24, or requests vehicle positioning information from the server 24. Thus, the field 56-11 may maintain a relatively accurate current location of the vendor device 22. It will be appreciated that a vendor 20 may have multiple vendor vehicles 18 and multiple associated vendor devices 22, and thus the field 56-11 may maintain such information about multiple vendor devices 22.

A field 54-12 may maintain the time of the last location update provided by the vendor device 22. A field 56-13 may identify a current route of the vendor device 22, and/or past routes of the vendor device 22. The current route may comprise a plurality of locations of the vendor device 22 as it moves from one location toward another location.

A field 56-14 may identify one or more vendor triggers, each of which may comprise one or more vendor trigger criteria, and a vendor trigger action that is performed by the server 24 upon the occurrence of a vendor trigger. A field 56-15 may identify an e-mail address associated with the vendor 20. A field 56-16 may identify an IM user name and service via which the vendor 20 can be sent IM messages. Much of this information may be provided, for example, by the vendor 20 during an initial vendor profile 34 set-up phase. Other information, such as the fields 56-8 and 56-11-56-14, may be maintained in real-time by the server 24. The vendor 20 can preferably modify certain information as desired, such as the creation, modification, or deletion of vendor triggers.

Figure 6:
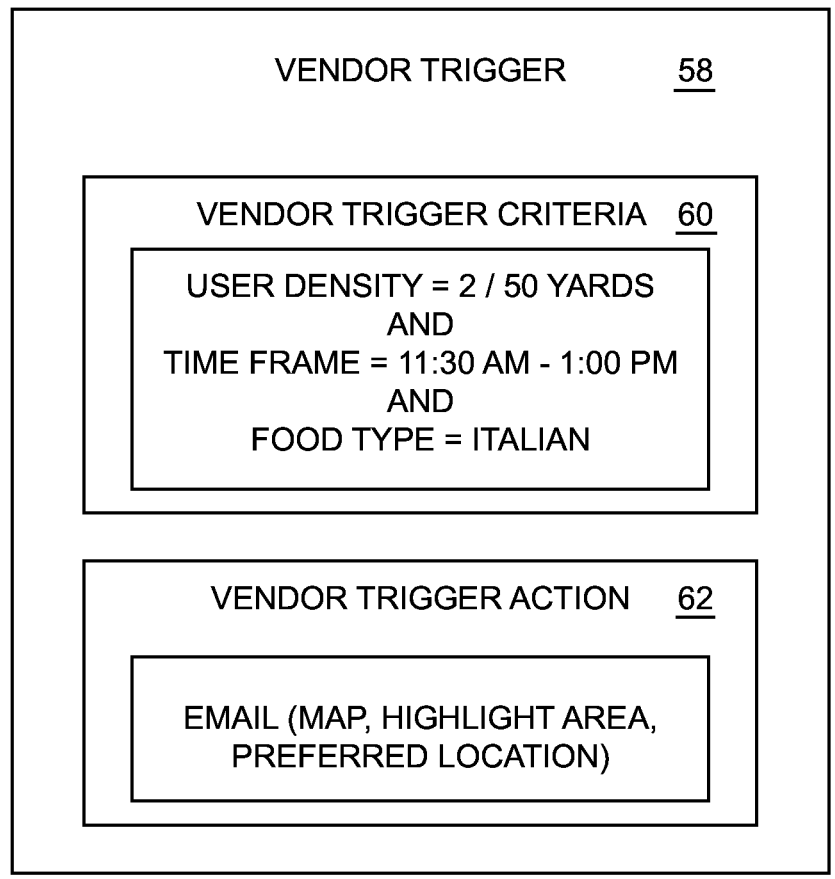
FIG. 6 is a block diagram illustrating a vendor trigger, according to one embodiment.

FIG. 6 is a block diagram illustrating an exemplary vendor trigger 58 according to one embodiment. The vendor trigger 58 may be configured by the vendor 20, and stored in a vendor profile 34 of the vendor table 50, for example. The vendor trigger 58 includes vendor trigger criteria 60, which identify when the vendor trigger 58 occurs. The example vendor trigger criteria 60 illustrated in FIG. 6 indicates that the vendor trigger 58 should occur when:

1) there is a user device density of at least two user devices 16 within an area having a 50-yard radius;

2) user devices 16 submit search requests that include a user search criterion of product type equal to "Italian;" and 3) such search requests are made between the hours of 11:30 am and 1:00 pm.

Upon the occurrence of the vendor trigger criteria 60, a vendor trigger action 62 indicates that the server 24 is to send an e-mail to the vendor device 22 associated with the vendor 20 which contains a map of the region, visually distinguishing the area in which the two users 14 are located, and identifying a particular preferred determined location for the vendor vehicle 18 based on the locations of the two users 14.

Figure 8:
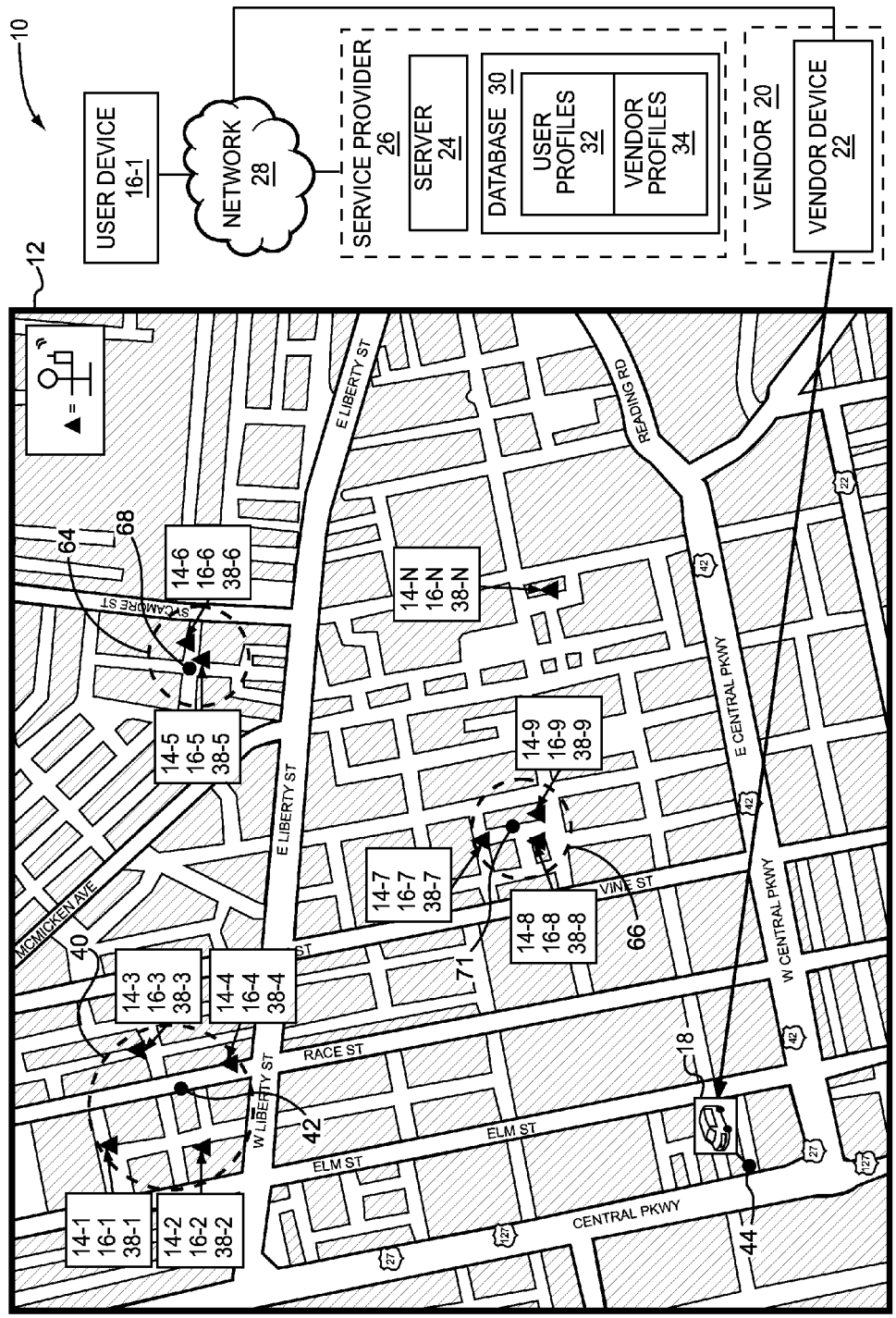
FIG. 8 is another diagram of the system illustrated in FIG. 1.

For purposes of illustration, an example of the vendor trigger 58 being triggered, or occurring, will be discussed. FIG. 7 is a table 70 that identifies exemplary search requests received from the user devices 16 by the server 24 over a period of time. FIG. 8 is another block diagram of the system 10 illustrated in FIG. 1. FIGS. 6, 7, and 8 will be discussed in conjunction with one another. Referring first to FIG. 7, column 72 identifies, for each user device 16, the time of the last search request received from the user device 16. Column 74 identifies, for each user device 16, the current location of each user device 16. Column 76 identifies, for each user device 16, the user search criteria of the last search request received from each user device 16. The server 24 monitors each vendor trigger, including the vendor trigger 58, to determine when a vendor trigger has occurred. Referring to the vendor trigger 58, the server 24 determines that the user devices 16-3, 16-5, 16-6, 16-7, and 16-9 have entered search requests for a food type of "Italian." Each of such search requests have occurred between the time frame of 11:30 am-1:00 pm, based on the "Time Of Search" data contained in column 72.

Referring now to FIG. 8, assume that circles 64 and 66 identify areas having a 50-yard radius. The server 24 determines that the locations 38-5 and 38-6 of the user devices 16-5 and 16-6, and the user search criteria last received from the user devices 16-5 and 16-6, satisfy the vendor trigger criteria 60, and thus that the vendor trigger 58 has occurred (i.e., has triggered). The server 24, based on the vendor trigger action 62, automatically, without input from the vendor device 22, generates a communication, such as an e-mail that includes a map of the region 12 which visually distinguishes the area encompassed by the circle 64 from the other areas in the region 12, and identifies a preferred determined location 68 that is about equidistant from the locations 38-5 and 38-6. The server 24 automatically sends the map to the e-mail address associated with the vendor device 22. In other embodiments, the server 24 may send one or more other forms of communications, such as a text, an instant message (IM), or may stream a real-time map display that may be presented on the vendor device 22.

The server 24 also determines that the locations 38-7 and 38-9 of the user devices 16-7 and 16-9, and the user search criteria last received from the user devices 16-7 and 16-9 satisfy the vendor trigger criteria 60, and thus that the vendor trigger 58 has occurred (i.e., has triggered). The server 24, based on the vendor trigger action 62, automatically, without input from the vendor device 22, generates an e-mail that includes a map of the region 12 which visually distinguishes the area encompassed by the circle 66 from the other areas in the region 12, and identifies a preferred determined location 71 that is about equidistant from the locations 38-7 and 38-9. The server 24 automatically sends the map to the e-mail address associated with the vendor device 22.

While for purposes of illustration, the server 24 has been described as generating a separate map for each occurrence of the vendor trigger 58, in one embodiment, if the vendor trigger 58 has occurred multiple times within a predetermined timeframe, the information may be presented in a single map. Thus a single map of the region 12 that visually distinguishes both areas encompassed by the circles 64 and 66, and that identifies both preferred determined locations 68 and 70 may be generated and communicated, such as via an e-mail, to the vendor device 22.

Figure 9:
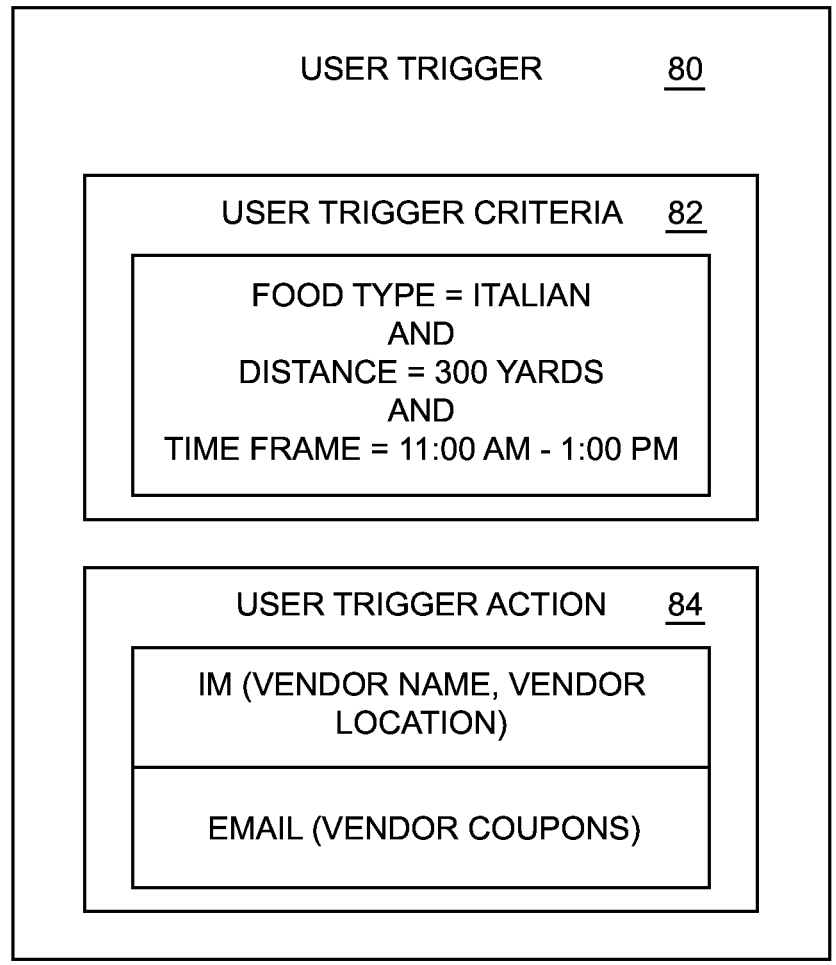
FIG. 9 is a block diagram illustrating a user trigger, according to one embodiment.

FIG. 9 is a block diagram illustrating an exemplary user trigger 80 according to one embodiment. Assume that the user trigger 80 has been configured by the user 14-1, and stored in the user profile 32-1 of the user table 46. The user trigger 80 includes user trigger criteria 82, which identify when the user trigger 80 occurs. The user trigger criteria 82 indicates that the user trigger 80 should occur when a vendor vehicle 18 which provides a food type of "Italian" comes within 300 yards of the location of the user device 16-1 between the times of 11:00 am and 1:00 pm. A user trigger action 84 indicates that upon the occurrence of such an event, the server 24 should generate an IM message containing the vendor name, which may be obtained, for example, from the field 56-1 of the vendor profile 34 associated with the respective vendor 20, and the current location of the vendor vehicle 18. Thus, when the user trigger 80 triggers, or occurs, the user 14-1 will receive an IM message indicating the name and location of a vendor 20 and vendor vehicle 18, respectively, which provides Italian food. The user trigger action 84 also indicates that when the user trigger 80 occurs, the server 24 should also send an e-mail to the user device 16-1 that includes any coupons offered by the respective vendor 20. Such coupons may be obtained by the server 24, for example, from the field 56-10 of the vendor profile 34 associated with the respective vendor 20. The field 56-10 may contain an actual image depicting one or more coupons, or may comprise links, such as URLs which reference the one or more coupons and which, when selected by the user 14-1, allow the user 14-1 to access the one or more coupons.

Figure 10:
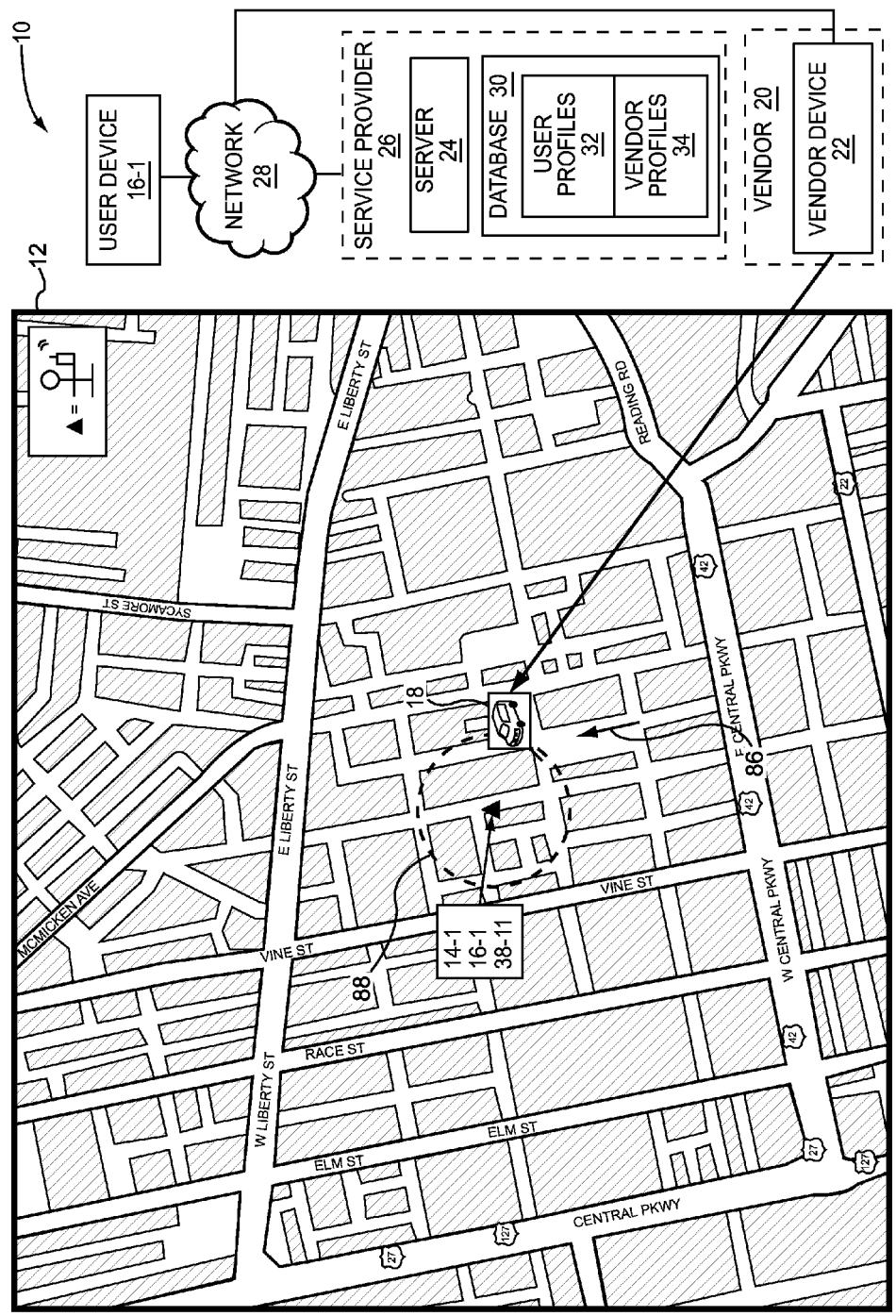
FIG. 10 is another diagram of the system illustrated in FIG. 1.

An example of the user trigger 80 being triggered will now be provided. FIG. 10 is another block diagram of the exemplary system 10, and will be discussed in conjunction with FIG. 9. Referring now to FIG. 10, assume that the user 14-1 is at a location 38-11 in the region 12. The user device 16-1 has provided the current location of the user device 16-1 to the server 24, which has stored the current location in the field 54-7 of the user profile 32-1 associated with the user 14-1. Assume that the vendor vehicle 18 provides a food type of "Italian" and at 12:00 pm is moving in a direction indicated by an arrow 86. A circle 88 indicates a distance of 300 yards about the location 38-11 of the user device 16-1. As the vendor vehicle 18 moves in the direction of the arrow 86, the vendor device 22 continually provides location update messages to the server 24 identifying the current location of the vendor device 22. As the vendor vehicle 18 moves into the area defined by the circle 88, the server 24 determines that the vendor vehicle 18 satisfies the user trigger criteria 82, and thus that the user trigger 80 has occurred (i.e., has triggered). The server 24, based on the user trigger action 84, automatically, without receiving input from the user device 16-1, generates an IM message identifying the name of the vendor 20 associated with the vendor vehicle 18 and identifying the location of the vendor vehicle 18, based on the most recent location update received from the vendor device 22. The server 24 may also send an e-mail to the user device 16-1 that includes a coupon, or a reference to a coupon, associated with the vendor 20 which offers a discount on a product sold via the vendor vehicle 18.

In one embodiment, the user 14-1 may travel, such as by walking, to the current location of the vendor vehicle 18, and redeem the coupon by merely displaying the coupon on a display of the user device 16-1 and permit the coupon to be scanned, or otherwise received, by a device associated with the vendor vehicle 18. The user 14-1 may also finalize the purchase using financial transaction data maintained in the field 54-16 of the user profile 32-1, and thus the transaction may not require the exchange of any actual currency.

In other embodiments, one or more coupons may be sent to a user 14 based on a vendor trigger 58. For example, a vendor 20 may configure or define a vendor trigger 58 that includes vendor trigger criteria such that if the vendor vehicle 18 comes within a predetermined distance of a user 14 who, based on the user profile 32 associated with the respective user 14, meets a certain criterion, then a coupon is automatically provided to the user device 16. Such user profile data may include, for example, whether the user 14 ever provided a search request for a product of the vendor 20, or is a user 14 who has never purchased a product from the vendor 20.

In yet other embodiments, a vendor 20 may manually initiate sending a coupon to a user 14. In one embodiment, in conjunction with providing a determined location to the vendor 20, the server 24 may determine that certain users 14 within the determined location have received coupons associated with the vendor 20, based on user triggers 80 and/or vendor triggers 58, and that other users 14 in the determined location have not received coupons. The server 24 may provide the vendor device 22 a list of those users 14 who have not received a coupon. The vendor device 22 may also provide, in conjunction with the list, user attributes associated with the users 14, such as food preferences of the users 14, whether the users 14 have ever purchased products from the vendor 20, and the like. The vendor device 22 may display the list of users 14 and the user attributes to an operator, who may select one or more of the users 14, via, for example, a touch-sensitive display or other input device associated with the vendor device 22. The vendor device 22 may then identify the selected user(s) 14 to the server 24, which in turn initiates a communication, such as an e-mail or IM, to the selected users 14 that includes coupon information identifying a coupon of the vendor 20.

Similarly, the vendor 20 may manually initiate sending other alerts to one or more users 14. In particular, the server 24 may identify those users 14 within a determined location, or a subset of such users 14 based on one or more criteria. The vendor device 22 may also provide, in conjunction with the list of users 14, user attributes associated with such users 14, such as food preferences of the users 14, whether the users 14 have ever purchased products from the vendor 20, and the like. The vendor device 22 may display the list of users 14 and the user attributes to an operator, who may select one or more of the users 14, via, for example, a touch-sensitive display or other input device associated with the vendor device 22. The operator may also select a particular alert, such as an alert indicating the location of the vendor vehicle 18, or may manually enter a desired message. The vendor device 22 may then communicate the alert(s) and identifiers associated with the selected user(s) 14 to the server 24, which in turn generates and initiates a communication, such as an e-mail or IM to the selected users 14 that contains the alert.

In one embodiment, the server 24 implements a "poke" functionality wherein a user 14, using an associated user device 16, may poke a particular vendor 20 to inform the vendor 20 of the location of the user 14 and an interest in purchasing a product of the vendor 20. In particular, the user 14 may initiate the poke by sending to the server 24 poke information which identifies the location of the user 14 and a vendor identifier that identifies a particular vendor 20. The server 24 then sends to a vendor device 22 associated with the vendor 20 a poke message that identifies the location 38 of the associated user device 16. The receipt of a poke message by a vendor 20 may be useful in determining an area in the region 12 that contains one or more potential customers. The server 24 may also include in the poke message information regarding the user 14. For example, the server 24 may access the user profile 32 associated with the user 14 and access one or more defined user attributes, such as the age, sex, income, or product preferences of the user 14, and provide such information in the poke message sent to the vendor device 22.

In one embodiment, in response to a search request from a user device 16, the server 24 accesses a plurality of vendor profiles 34, and identifies at least one vendor 20 based on a match between the user search criteria in the search request and vendor data maintained in a vendor profile 34. The server 24 determines a current location of a vendor vehicle 18 associated with the at least one vendor 20, and sends the current location of the vendor vehicle 18 to the user device 16 that issued the search request. The server 24 may determine that the at least one vendor 20 has a plurality of vendor vehicles 18 in operation, and may identify the particular vendor vehicle 18 that is closest to the respective user 14.

The server 24 may also identify a plurality of vendor profiles 34 that match the user search criteria. The server 24 may determine a current location of a vendor vehicle 18 associated with each vendor 20 whose vendor profile 34 matches the user search criteria, and provide the current locations of multiple vendor vehicles 18 to the user device 16 that issued the search request.

Figure 11:
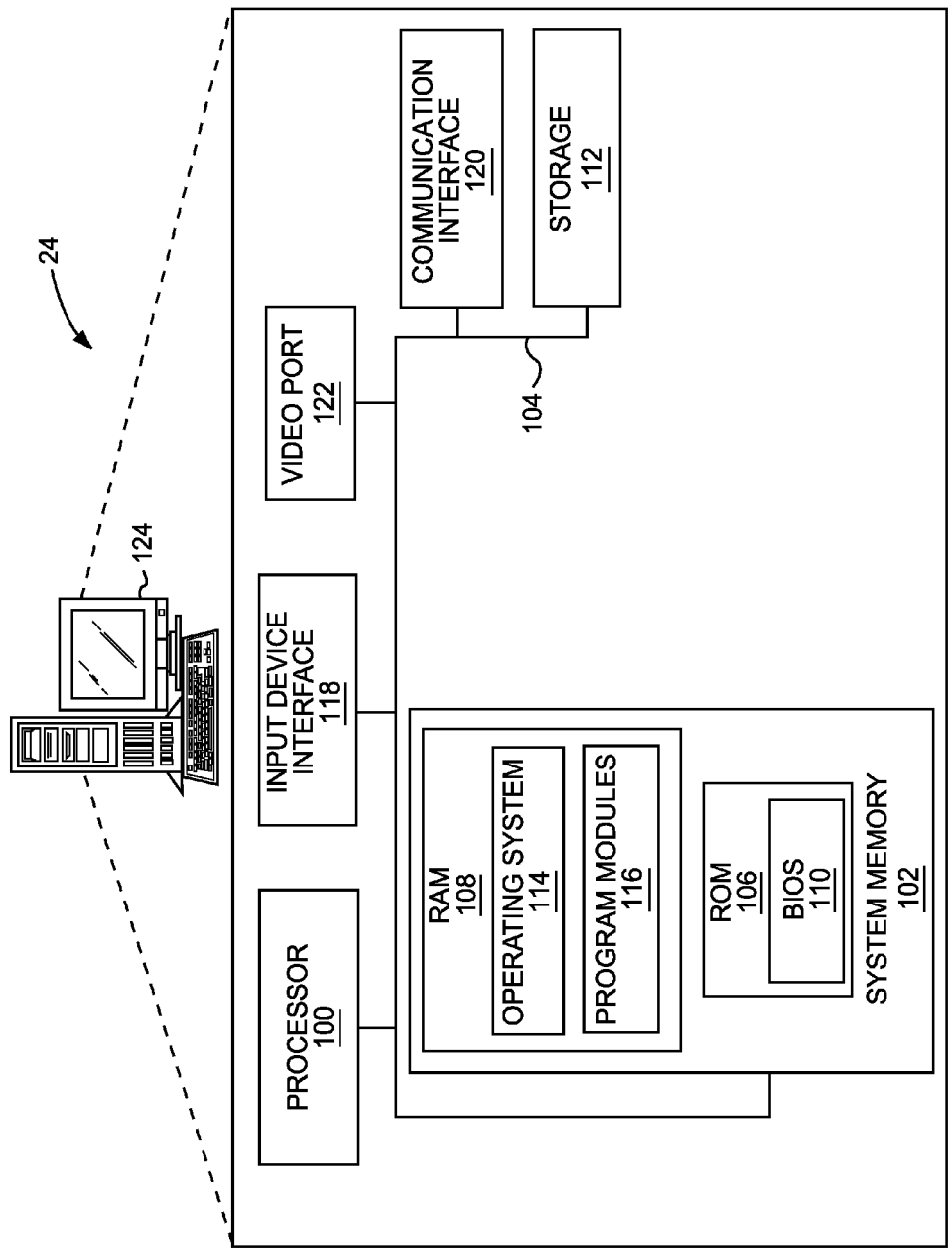
FIG. 11 is a block diagram illustrating a server in greater detail, according to one embodiment.

FIG. 11 is a block diagram illustrating an exemplary server 24 in greater detail according to one embodiment. The server 24 may comprise, for example, a computer, such as a laptop or desktop computer, a workstation, or any other processing device capable of implementing the functionality described herein. A processor 100 is coupled to a system memory 102 via a system bus 104. The system bus 104 provides an interface for system components including, but not limited to, the system memory 102 and the processor 100. The processor 100 can be any of various commercially available or proprietary processors. Dual microprocessors and other multi-processor architectures may also be employed as the processor 100.

The system bus 104 may be any of several types of bus structures that may further interconnect to a memory bus (with or without a memory controller), a peripheral bus, and/or a local bus using any of a variety of commercially available bus architectures. The system memory 102 may include non-volatile memory 106 (e.g., read only memory (ROM), erasable programmable read only memory (EPROM), electrically erasable programmable read only memory (EEPROM), etc.) and/or volatile memory 108 (e.g., random access memory (RAM)). A basic input/output system (BIOS) 110 may be stored in the non-volatile memory 106, and can include the basic routines that help to transfer information between elements within the server 24. The volatile memory 108 may also include a high-speed RAM, such as static RAM, for caching data.

The server 24 may further include, or be communicatively coupled to, a storage 112, which may comprise, for example, an internal hard disk drive (HDD) (e.g., enhanced integrated drive electronics (EIDE) or serial advanced technology attachment (SATA)) for storage, solid-state memory, flash memory, or the like. The storage 112 and associated computer-readable and computer-usable media provide non-volatile storage of data and data structures such as the database 30, user profiles 32, vendor profiles 34, and the like, as well as computer-executable instructions for implementing functionality described herein with respect to the server 24. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing the novel functionality described herein.

A number of modules can be stored in the storage 112 and in the volatile memory 108, including an operating system 114 and one or more program modules 116, which may implement the functionality described herein in whole or in part. It is to be appreciated that the embodiments can be implemented with various commercially available operating systems 114 or combinations of operating systems 114.

All or a portion of the embodiments may be implemented as a computer program product, such as a non-transitory computer-usable or computer-readable medium having a computer-readable program code embodied therein. The computer-readable program code can include software instructions for implementing the functionality of the embodiments described herein when executed on the processor 100. The processor 100, in conjunction with the program modules 116 in the volatile memory 108, may serve as a controller, or as a control system, for the server 24 that is configured to, or adapted to, implement the functionality described herein.

An administrator may be able to enter commands and information into the server 24 through one or more input devices (not illustrated), such as, for example, a touch-sensitive display screen, a keyboard, or a pointing device, such as a mouse. Other input devices may include a microphone, an infrared (IR) remote control, a joystick, a game pad, a stylus pen, or the like. These and other input devices are often connected to the processor 100 through an input device interface 118 that is coupled to the system bus 104, but can be connected by other interfaces such as a parallel port, an Institute of Electrical and Electronics Engineers (IEEE) 1394 serial port, a game port, a universal serial bus (USB) port, an IR interface, etc. The server 24 may also include a communication interface 120 that is configured to communicate with the network 28. The server 24 may also include a video port 122 configured to drive one or more display devices 124.

Figure 12:
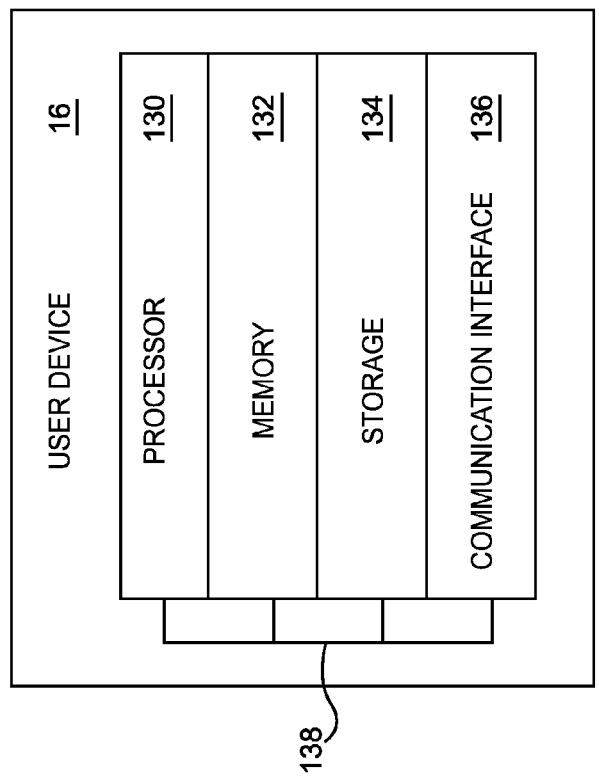
FIG. 12 is a block diagram of a user device, according to one embodiment.

FIG. 12 is a block diagram of an exemplary user device 16 according to one embodiment. As discussed above, the user device 16 may comprise, for example, a smartphone, such as an Apple® iPhone®, or Android®-based smartphone; a laptop computer; a computer tablet, such as an Apple® iPad®, or Android®-based tablet; or the like. The user device 16 includes a processor 130 that is communicatively coupled to a memory 132. The memory 132 may contain program instructions which, when processed by the processor 130, implement all or a portion of the functionality described herein with respect to the user device 16. A storage 134 may store, among other data, computer-readable program code that includes software instructions for implementing the functionality of the embodiments described herein when executed on the processor 130. In one embodiment, such storage 134 may comprise a computer program product, such as a non-transitory computer-usable or computer-readable medium having a computer-readable program code embodied therein. A communication interface 136 facilitates communication with the network 28. A bus 138 facilitates communications between the various components of the user device 16.

Figure 13:
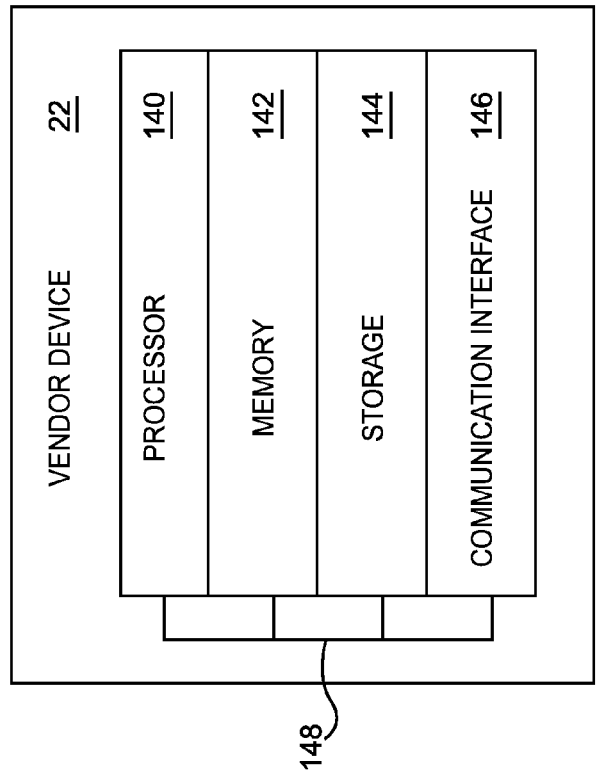
FIG. 13 is a block diagram of a vendor device, according to one embodiment.

FIG. 13 is a block diagram of an exemplary vendor device 22 according to one embodiment. As discussed above, the vendor device 22 may comprise, for example, a smartphone, such as an Apple® iPhone®, or Android®-based smartphone; a laptop computer; a computer tablet, such as an Apple® iPad®, or Android®-based tablet; or the like. The vendor device 22 includes a processor 140 that is communicatively coupled to a memory 142. The memory 142 may contain program instructions which, when processed by the processor 140, implement all or a portion of the functionality described herein with respect to the vendor device 22. A storage 144 may store, among other data, computer-readable program code that includes software instructions for implementing the functionality of the embodiments described herein when executed on the processor 140. In one embodiment, such storage 144 may comprise a computer program product, such as a non-transitory computer-usable or computer-readable medium having a computer-readable program code embodied therein. A communication interface 146 facilitates communication with the network 28. A bus 148 facilitates communications between the various components of the vendor device 22.

Additional embodiments are discussed below.

General Description

An integrated system of network-enabled hardware and software (including but not limited to desktop and mobile-device optimized applications and/or network user interfaces) that allows for Mobile Businesses ("Vendors") and their "Customers" to more effectively and efficiently connect and conduct business with each other, often in a real-time manner.

Industry applications may include, but not be limited to:

Mobile Food Vendors: To connect (in real-time) mobile food vendors (e.g., gourmet or specialty mobile food trucks) with customers searching for a particular meal option in the vicinity of their current location.

Mobile Clothing Vendors: To connect (in real-time) mobile retailers with customers searching for a particular brand name or clothing item in the vicinity of their current location.

Other Mobile Retailers and Businesses: To connect any mobile business with any customer searching for a particular item in the vicinity of their current location.

Features and functionality may include, but not be limited to the following:

1) Vendor Profiles (with Real-Time Geospatial Positioning)

General Description: A Vendor online profile is created and the Vendor's location information may then be manually entered or automatically collected (via the network) in a real-time, continuous manner and stored in a searchable, network-accessible database to allow Customers to search for, locate and navigate to the Vendor, often in real time manner.

Through a Web interface, desktop or mobile device application or other method of interface a Vendor (or an agent) will pre-register with a service provider to create an account (profile) and will provide the service provider with various data, content and/or uploads about their business to assist Customers in searching for them, which may include, but not be limited to:

Owner or Business Name, e-mail address, and/or other contact information, Vendor's general product category, specific product listings, price information, business hours, logos, photos, URL to Vendor's Website, downloadable coupons or information on specials, and other Vendor profile information and other business information that describes their products, business, services or other business attributes.

The registered Vendor may also enter banking or other financial information to allow for electronic transactions.

The registered Vendors also provide the service provider a mechanism and/or permissions for tracking and monitoring their physical location via GPS or other network or positioning methods.

Methods for real-time geospatial positioning may include, but not be limited to, using a GPS-enabled mobile device connected to a network that is accessible by the service provider or using cellular or other radio transmissions to triangulate the position of the Vendor.

Tracking data may be collected and stored directly or indirectly through a third-party network or other information service.

All profile and account data, content, uploads, positioning data or other data about the vendor are stored in a table(s) in a database(s) on a server(s) and is associated with the Vendor's account.

This server(s) may be a standalone server and/or a cloud-based or scalable network.

The Vendor has the ability to log into their account via desktop, mobile and other devices to manage their account and perform functions including, but not limited to, ability to "turn on" or "off" their positioning signal and also to designate whether they are "open" or "closed" for business at any given time. A method of notification (such as a graphic or distributed electronic message) may enable a Customer to recognize the Vendor's current status as open for business or currently closed.

The Vendor has the ability to log into their account via desktop, mobile and other devices to add to, modify, edit, hide and/or delete their data, content or uploads.

On a manual or automatic basis, the server(s) may also collect, store, analyze and transmit other information about the Vendor including, but not limited to:

Current or past location data, Vendor's device type or software version, Vendor usage statistics, Vendor's stored customer lists, Customer ratings data about Vendor, or any other information about the Vendor or their Customers that relates to their business activity.

2) Customer Profiles (with Real-Time Geospatial Positioning)

General Description: A Customer profile is created and their location information is then manually entered or automatically and/or continuously collected (via the network) and stored in a searchable and networked database.

Through a Web interface, desktop or mobile device application or other method of interface a Customer (or an Agent) will pre-register with a service provider to create an account and will provide the service provider with data, content and/or uploads which may include, but not be limited to:

Name, e-mail address, address, mobile number, product category preferences, network alert preferences (see Alert feature), a photograph, social network account information, certain demographic data, mobile device type, etc.

The registered Customer may also enter banking or other financial information to allow for electronic transactions.

The registered Customers also provide the service provider a mechanism and/or permissions for tracking their location via GPS or other network or positioning methods.

Methods for real-time geospatial positioning may include, but not be limited to, using a GPS-enabled mobile device connected to a network that is accessible by the service provider or using cellular or other radio transmissions to triangulate the position of the Vendor.

Tracking data may be collected directly or indirectly through a third-party network or other information service.

Data, content, uploads, positioning or other data about the Customer are stored in a table(s) in a database(s) on a server(s).

This server(s) may be a standalone server(s) and/or a cloud-based or scalable network(s).

The Customer has the ability to log into their account via desktop, mobile and other devices to turn on or off their positioning signal.

The Customer or their Agent has the ability to log into their account via desktop, mobile and other devices to add to, modify, edit, hide and/or delete their data, content or uploads or otherwise manage content associated with them.

On a manual or automatic basis, server may also collect, store, analyze and transmit other information about the Customer including, but not limited to:

Current or past location data, Customer's device type or software version, Customers usage statistics, Customer's stored Vendor lists or any other information about the Customer that relates to their mobile vendor transaction activity.

3) Searchable, Networked Database (with Real-Time Positioning and Mapping Features)

General Description: A searchable database containing both the Vendor and Customer profile information that could be used, for example, by a Customer to locate a Vendor(s) of interest that meets certain criteria (e.g., by a search criteria such as their product category, distance from Customer, price range, quality ratings, etc.) and to map the Vendor's current location relative to the Customer in a real-time manner using GPS or other positioning methods with the intention of engaging in a business transaction with them.

Detail:

Customer's desktop or mobile device contains a network interface method or application that, when initiated, connects to a server(s) maintained by a service provider and passes the server a user initiated request that includes general information of the user which could include, but not be limited to:

Customer's current or past (saved) search criteria, Customer's current or past location, Customer's profile information, usage history, Customer's buddy list, Customer's saved or 'favorite' Vendor or product category list, Customer's device type or software version, or any other information about the Customer or their product preferences or usage patterns.

The search criteria selected by the Customer ("Customer initiated search request") are also then passed to the server and stored in a table.

The server also contains a table(s) with registered Vendor profile information.

When the server receives the Customer initiated search request, the server accesses the table(s) and searches for matches between the Customer criteria and vendor Profiles and selects and returns one or more Vendor profile entries from the table(s).

The server can analyze, sort and prioritize the return data based on multiple Customer selected criteria including, but not limited to, the product type the Customer has requested, the Customer's location, the current position of a Vendor, the Customers preferred price range, Customers preferred Vendor rating level, etc.

The server(s) returns to the Customer a text or graphical version report(s) that may include a list of Vendors that best meet their search criteria and also a real-time map that indicates where the Vendors currently are located, as well as other information about the Vendor to assist the Customer in selecting a Vendor that best meets their search criteria or preferences. This may include, sortable data including but not be limited to:

Other customer feedback ratings, specials or coupon information, or any other information about their product, business, location or service.

4) Customer Data Analytics and Reporting Function (for Vendors)

General Description: The system has the ability to store Customer search queries with the Customers' profile information and, either via manual or automatic methods, analyze these Customer(s) input(s) and search data and generate reports, such as "heat maps", that map Customer locations or search history based on various criteria such as products of interest. The purpose would be to use these heat maps to direct Vendors to the areas of highest potential Customers at the times of day where there has historically been the highest frequency of searches for their product(s) with the intent of maximizing the opportunity for a business transaction.

A specific example would include a Vendor producing a customized heat map showing all the Customers that searched for "pizza" between 11 am and 2 pm within a certain zip code; the intensity of searches for "pizza" might be color coded (red=a high frequency of searches during this window, yellow=moderate number, and green=fewer searches for pizza in this time and geographic window). The Vendor may choose to position their business at the heart of that zip code during this time in order to maximize the potential of attracting pizza customers.

Detail:
Upon submitting a Customer initiated search request, data about the Customer and the search event are stored in a table(s) in the server(s). These data about the Customer or their search may include, but not be limited to:
Time of day of the search(es), date of search(es), search criteria, location of Customer at time of search (coordinates, Zip code, etc.), Customer's current location, Customer profile or other information about the Customer, usage data regarding the Customer or any other information about the Customer or their search.
The data from across multiple Customers can then be compiled, manually or automatically analyzed and sorted and a variety of written or graphic-based reports and outputs may be generated that may include, but not be limited to:
"Heat maps" that show time-based patterns of search intensity by Customers for a particular product (e.g., total number of searches for a particular product category or search by each hour in the day in a certain area)
"Customer maps" that map a specific Customer type that has searched for a particular product category (e.g., Customers that "are active users and conduct searches greater than 3 times a week and are currently searching for particular product", or users that "reside within a certain geographic zone", or "users that are use the service heavily and are searching for something at this moment", users with a certain income level, etc.).
These reports are stored on the server for access by a Vendor for later viewing and/or download).
These reports can also be available in a "real time" manner to Vendors—transmitted directly to a mobile Vendor's mobile device on a regular basis, in real-time (or in any time increment) or "on-demand". This may include, but not be limited to, text alerts with geographic information indicating where searches are being conducted for their product(s), map-based, real-time heat maps that illustrate when and where searches are being conducted
Vendors would use the reports to identify optimal location(s) where high-densities of customers have conducted or are conducting a search for their product or business category, with the purpose of relocating their business to an area of "high intensity" to maximize the opportunity to engage in a business transaction with Customers searching for their product(s).
Vendor's would pay for these data service(s) in various contact and bundle offerings sold by the service provider.

5) Optimal Positioning Algorithm (for Vendors)

General Description: A decision tool that assists a Vendor in optimizing their location relative to the greatest number of actual or potential Customers (i.e., to minimize the distance between the greatest number of potential Customers that are searching for, or have previously searched for, their product) in order to increase the probability of a sales transaction(s) by making it more convenient for Customers (i.e., less walking distance).

Detail:
Upon submitting a Customer-initiated search request for Vendors or products, the Customer's search criteria data (and data about the Customer) are stored in a table(s) in the server(s). These data about the Customer or their search may include, but not be limited to:
Time of day when a search is conducted, date of search, search criteria, location of Customer at time of search, Customer's current location, Customer profile or other information about the Customer, usage data regarding the Customer or any other information about the Customer or their search.
These data could thus be used by Vendors wishing to locate their business in an area containing a high number of Customers they are targeting. This may be accomplished a number of ways including, but not limited to:
The data may then be manually or automatically analyzed and sorted based on various criteria and/or mapped to show the locations of individual Customers or Customer searches of interest, or groupings of like Customers or like searches.
This may be performed by a Vendor or other party on the network accessing the search data and sorting, analyzing, and/or summarizing the data.
Upon initiating such a request, the Vendor may initiate a positioning algorithm tool that extracts the Customer data and calculates an "optimal" location for the Vendor based on particular attributes that may include, but not be limited to, "minimizing distance from the largest number of potential customers"
Specifically, the algorithm provides recommended coordinates or navigation instructions for the Vendor to best position their mobile business as close as possible to the maximum number of customers searching for their product (currently or historically). A mapping feature may be used to visually assist the Vendor in positioning their vehicle (e.g., a map with icons or other graphic means may help the Vendor locate to the ideal position).
By reducing the distance to the maximum number of customers the Vendor reduces the travel distance of a high number of customers with the intent of maximizing sales.
Upon repositioning of the mobile business to a location closer to the Customers, Customers that have recently inquired about a product type could then be notified (via e-mail, text, or other electronic communication) that the product they recently searched for (or is a declared preference in their profile) is in now in their vicinity.

A variety of written or graphic-based reports and outputs (summary and/or real time) may be generated that may include, but not be limited to maps marking the recommended Vendor positioning location(s) including information relating to the Customers in or near that location (e.g., demographic data, usage statistics, etc.).

For example, a Vendor may use the data to identify all of the Customers that (1) use the system at least 2 times a week, (2) have searched for "That Food" or have listed That Food as a favorite category in their Customer profile, and (3) reside within a particular zip code. The algorithm would then generate optimal geographic coordinates (perhaps time based) for the Vendor to locate their business to reduce the distance between the Vendor and the highest number of Customers that meet their search criteria. The Vendor could use the report to review profile information about the Customers to better understand them.

6) Real-time Customer "Pokes" to Vendors

General Description: Allows customers to "Poke" mobile Vendors to attract their attention in order to encourage them to relocate their mobile business to a closer geographic location with the purpose of engaging with them in a business transaction.

Detail:
If a mobile vendor that is identified through a Customer-initiated search is identified to be at a greater distance from the Customer than the Customer desires, the Customer may initiate an electronic 'poke' to communicate to the Vendor that there is a potential Customer in the geographic region interested in their product or service that would like them to relocate closer to them.

To initiate and execute a "poke":
A Customer is pre-registered with a service provider and have an account in the database
The Customer is actively broadcasting their geographic location
The Vendor is also be pre-registered and identifiable to the network (including positioning information).
The Customer is select a Vendor through any means including but not limited to: Selecting the Vendor from their "Saved" list, selecting the Vendor after conducting a search for a product type in the area, etc.)
The user initiates the "Poke" request through their desktop, mobile, or other interface.
Upon submitting a Customer initiated "Poke" request, data are stored in a table(s) in the server(s). These data about the Customer or their "Poke" may include, but not be limited to:
Time of day when poke was initiated, date of poke, location of Customer at time of poke, Customer's current location (if different), Customer profile or other information about the Customer, usage data regarding the Customer or other information about the Customer or their search.
Either via pre-defined automatic broadcast or upon a manual inquiry via a Vendor-initiated request, the network will then transfer to the Vendor information regarding a "Poke" or "Pokes" they have received from a potential Customer(s) interested in engaging in a transaction with them.
Information transmitted may be in the form of individual or consolidated electronic communications such as text reports, statistics, or visual reports (i.e., heat maps) that allow the vendor to understand how many pokes they have received, what potential Customers have initiated them, where those Customers were or are located, information about those Customers (e.g., frequency of usage or purchase information), and data to help them optimize their location to address as many potential customers as possible (i.e., optimized position algorithms)
A Vendor that is monitoring for and receives a high number of "Pokes" may thus decide to relocate their business closer to the highest density of Pokes in order to maximize the potential for business transactions.

7) Vicinity Alerts (for Customers)

General Description: Allows Customers to actively and automatically monitor a pre-defined geographic zone for any preferred Vendor(s) (or a Preferred Product Category) and to receive an alert (e.g., text, IM, call or other notification method) when a preferred Vendor has moved to within their local vicinity/pre-defined geographic boundary during a pre-defined time period in the day. The purpose would be so they can be automatically notified when a Vendor with product of interest is near so they can conduct a transaction with them (without having to continually monitor the Vendors location manually).

Detail:
Upon initiating a Customer-initiated search(es) to the database and identifying Vendor(s) of interest, a Customer may identify a mobile Vendor(s) that is of interest to them
This could include either a specific vendor or simply a product category such as "pizza"
Alternately, a Customer may already be familiar with a specific Vendor name and manually or automatically locate them in the database
In either case, the Customer may tag the vendor as a "Favorite"
In this case, the Vendor's unique identifier is stored as a Favorite in the Customers profile table in the database
The Customer may then initiate a "vicinity alert" associated with that tagged Vendor.
This alert may be turned off or back on by the customer.
To initiate and execute a vicinity alert:
A Customer is pre-registered with a service provider and have an account in the database and is be actively broadcasting their geographic location
A Vendor is be pre-registered with a service provider and have an account in the database and is be actively broadcasting their geographic location
The Customer initiates the request through a desktop or mobile interface
Upon issuing the vicinity alert, their interface connects to a server maintained by a service provider and passes the server a customer initiated request that is stored in a table. Information stored in the table may include, but not be limited to:
Customers current location and other certain data which may include preferences including, but not limited to:
A pre-defined geographic zone preference
"Time window preferences" (i.e., a Customer may establish that they only wish to be notified if a preferred/tagged Vendor is in their pre-defined geographic zone during certain hours of the day (i.e., during dinner hours of 6 pm to 8 pm)
The Mobile vendors that are 'tagged' as those which the Customer desires the network to monitor and track for them
Other information including: time of day when alert was initiated, date of alert, location of Customer at time of alert, Customer's current location (if different), Customer profile or other information about the Customer, usage data regarding the Customer or other information about the user or their search.

Simultaneously, the server is storing and tracking information about mobile Vendors, including but not limited to:

Their current location and business status (i.e., whether they are currently open for business or not)

General information including their Vendor product category, product listing, price information, business hours, logos, photos, URL to vendor's Website, downloadable coupons or information on specials, vendor profile information and other business information that describes their products, business, services or other business attributes.

When the network recognizes that a tagged Vendor and/or mobile Vendor of choice has entered into the geographic zone preferred by a Customer in the time window preferred by the Customer, the network provides an alert to the Customer to let them know that a tagged and preferred vendor is in the desired vicinity This alert may take any form including, but not limited to, a text message, e-mail, phone call, IM or other form of notification.

The overall purpose is for the system to monitor the Vendor locations for the Customer and to let them know when the Vendor comes close to them.

8) Vendor Issuance of Electronic Coupons.

General Description: To entice Customers to engage in a transaction with them, mobile Vendors may advertise and/or distribute electronic coupons either by widely publishing them (by displaying in their profile or posting as a banner ad for all Customers to see) or by transmitting a targeted data file containing the coupon information directly to a specific Customer(s) that meets a particular criteria pre-specified by the Vendor.

Detail:

A registered Vendor may upload a pre-designed electronic coupon data file and/or create an electronic data file(s) that is stored in a table linked to their profile data on the server that may include, but not be limited to, information about a current special, sale, discount, promotion, or other customer incentive program.

The Vendor may "publish" the uploaded coupons to be visible to all Customers that may view their specific profile in the database (for example, the coupon may be visible as a graphic or button in the Vendor profile that the Customer can click to initiate.

The Vendor may also choose to more widely "publish" the coupons to be visible to any Customers searching or using the system (for example, the coupon may be visible as a graphic or button in a "banner ad" or other "frame" on somewhere on the Customer interface.

To display coupon data, the Customer interface would lookup coupon data stored in the table on the server and display it in a frame in a particular Vendor's profile or in another area (e.g., general banner ad area) of the User interface or User application.

An algorithm may be used to control which coupon file is displayed, the duration of its display, or any other aspect associated with the coupon data file. This may be manually or automatically controlled by the site administrator or other Users with permissions to manage the posting and management of coupon data. This for example, may result in coupons from Pizza Vendors currently in the area appearing when a Customer searches for this product category.

The image may be an 'active' hyperlink and capable of being selected (i.e., redeemed) through some means via the User interface (e.g., clicked upon) or a static image.

Upon a Customer "redeeming" the coupon (clicking on the active hyperlink), a request is transmitted to the database and stored in a table. The data may include, but not be limited to:

Time of day, date, location of Customer at time of redemption, Customer's current location, Customer profile or other information about the Customer, usage data regarding the Customer or other information about the Customer or their search.

A unique number or identifier may be associated with the redemption event so the Customer, Vendor, and other information may be linked or associated with the redemption event. This redemption 'event' is stored in table and is associated with at least the Vendor and Customer.

The network system may transmit to the Customer and/or Vendor information relating to the redemption event to include, but not be limited to:

To Customer: Confirmation the event has been recorded, additional information about the coupon or Vendor (i.e., business hours, confirm current location, etc.)

To Vendor: Information about the Customer (profile), time of day of the redemption event, their current location or location at time of redemption, etc.)

The vendor may also establish specific criteria or conditions by which a coupon is only distributed to, or viewable by, certain Customers that meet the Vendor's criteria.

The coupon may only be electronically transmitted to or displayed to targeted Customers that meet pre-defined criteria established by the Vendor (e.g., a Customer newly registered within that past 7 days, a "regular" Customer that uses the system at least once a week, a customer that has provided them with positive reviews and feedback, etc.)

To initiate a targeted coupon, the Vendor initiates a user request and enters certain Customer criteria of interest to them These data are stored in a table on the server and is associated with the Vendor and the coupon data When a Customer is identified on the network that meets the Vendor pre-defined criteria, the pre-loaded coupon is transmitted and/or displayed to the Customer in some electronic form.

The coupon data would be made visible to the Customer and may exist as 'active' link capable of being selected (i.e., redeemed) through some means via the User interface (e.g., clicked upon by the Customer)

Upon a Customer "redeeming" the coupon, a request is transmitted to the database and stored in a table. The data may include, but not be limited to:

Time of day, date, location of Customer at time of redemption, Customer's current location, Customer profile or other information about the Customer, usage data regarding the Customer or other information about the Customer or their search.

A unique number or identifier may be associated with the redemption event so the Customer, Vendor, and other information may be linked or associated with the redemption event. This redemption 'event' is stored in table and is associated with at least the Vendor and Customer.

The network system may transmit to the Customer and/or Vendor information relating to the redemption event to include, but not be limited to:

To Customer: Confirmation the event has been recorded, additional information about the coupon or Vendor (i.e., business hours, confirm current location, etc.)

To Vendor: Information about the Customer (profile), time of day of the redemption event, their current location or location at time of redemption, etc.)

Any other feature or functionality associated with online advertising, coupons, specials, etc. may be included.

Example Flow/Operation:

Vendor may establish coupon tiers/categories and then program triggers that selectively issue coupons to particular users based on user attributes (i.e., 'selective issuance' of coupons)

"New users" receive a 20% coupon (to entice them for their first purchase), while "returning users" only receive a 10% coupon "Users situated 50-100 yards of vendor" receive a 20% coupon (i.e., they have farther to walk), while "users that are <50 yards away" (i.e., less distance to walk) receive only a 10% coupon Prior to the issuance to a user(s) by the trigger or manual issuance by the vendor, the coupon is tagged with digital signature and/or various metadata, nonlimiting examples including:

vendor name or id

Time of issuance

Location of vendor at time of issuance

Location of customer at time of issuance

Time window of validity (e.g., expires in 30 minutes)

Geographic range of validity (e.g., only valid while the vendor is still within 100 yards of the location at initial issuance)

Etc.

When the customer walks up to the vendor to redeem it, there is a 'validation' that must first occur for the coupon before it is redeemed:

Recognition step

Coupon can be "automatically" scanned or recognized by the vendor (using any method or protocol including near-field scan, Bluetooth, bar code, etc.)

Coupon can be "manually" recognized by the vendor (visually inspected on user phone, a coupon activation code is manually entered by vendor or user into the user device, etc.)

Validation

Recognized coupon is next compared with the digital signature and/or various metadata to confirm this vendor issued this coupon to this user and that it is valid according to any limiting terms Redemption To redeem, the coupon must be activated/executed using any automatic or manual means (e.g., vendor provides a code for user to enter into their device; vendor's device sends a signal to the user device accepting it, etc.)

Storage

All data about the coupon are stored in the user profile in the table

Financial Transaction

The system provides the mechanisms for electronic payment for the product (i.e., using the user's credit card data stored on their profile, third party banks, etc.)

Data associated with this location based transaction is stored (the coupon data previously described, the time/location/amount/etc. of the transaction, etc.)

9) Vendor "Typical Route" Tracking and Mapping (for Customers)

General Description: If Vendors tend to operate their mobile business in a typical pattern with respect to geographic location and time, they may desire to publish their typical "route maps", or a visible time stamped, "bread crumb trail" in order to inform Customers so they can better predict how to locate the Vendor at a given time of day should they wish to engage in a transaction with the Vendor.

Detail:

A registered Vendor(s) may initiate its device or the device may automatically connect to a server(s) maintained by a service provider(s) and pass the server(s) information about the Vendor(s) that may include, but not be limited to:

Time of day, date, Vendor's name or unique identifier, Vendor's geographic coordinates, Vendor's profile information and other information such as Vendor's usage history, device type or software version, or any other information about the Vendor or their business or usage patterns.

These data are stored in a table on a network server(s)

When the server receives a user initiated request (i.e., from a Customer or Vendor), the server accesses the table(s) and selects and returns one or more entries from the table(s) based on search criteria provided.

The server can analyze and sort the data based on user-defined criteria and return outputs that summarize the results desired For example, a user may desire to know the total range of coordinates a specific Vendor has been positioned during a defined 24 hour period The server(s) may return to the user a written or graphical report that may include information about Vendor(s) that meet their search criteria or a graphical or text summary that indicates where the Vendors have been positioned within a defined period of time.

For example, this output may take the form of a route map that highlights the travel route (e.g., colored lines) of the Vendor in a single 24 hour period.

These requests and related outputs may be customized to allow for different views including, but not limited to:

For example, outputs may also include, but not be limited to maps that highlight Vendor routes with distinguishing elements such as the "route most traveled", "route slowest or fastest traveled", "time of day a particular route is typically travelled", the route covered during a defined period of time, or a route covered only during a certain day of the week, etc.

The Vendor would have some element of control over this route information to include, but not be limited to whether the route map is published (public) or not. This could be accomplished by turning on or off the flow of geographical positioning data flowing to the server, or by selecting to be visible or not in various route map outputs.

10) Searchable Customer Database (with Real-Time Positioning and Mapping)

General Description: Vendors may be interested in searching the database to identify Customers of interest to them as well as the Customer's current location or location patterns with the purpose of relocating their mobile business to an area closer to those Customers they are targeting to increase the probability of conducting in a business transaction with them.

Detail:
- A registered Customer(s) device connects to a server(s) maintained by a service provider(s) and passes the server(s) information about the Customer(s) that may include, but not be limited to:
  - Time of day, date, Customer's name or unique identifier, Customer's past or current geographic coordinates, Customer's profile information and other information such as Customer's usage history, device type or software version, or any other information about the Customer or their preferences or usage patterns.
- These data are stored in a table on a network server(s)
- A registered Vendor(s) device connects to a server(s) maintained by a service provider(s) and passes the server(s) information about the Vendor(s) that may include, but not be limited to:
  - Time of day, date, Vendor's name or unique identifier, Vendor's past or current geographic coordinates, Vendor's profile information and other information such as Vendor's usage history, device type or software version, or any other information about the Vendor, their business, preferences or usage patterns.
- These data are stored in a table on a network server(s)
- A Vendor may wish to search for Customers that meet specific criteria they designate. Upon selecting such criteria, the criteria are transmitted to the server where they are stored in the table.
- The server may manually or automatically access, analyze, sort and/or process the Vendor search request by accessing the table(s) and selecting and returning information about one or more Customers from the table(s) based on search criteria provided (i.e., return information about Customers that match one or more criteria selected by the Vendor in their search). The Customer data returned to the Vendor may take many different forms and/or represent many different 'cuts' or views' or 'outputs':
  - For example, a Vendor may desire to know which Customers have passed within a certain geographic range within a certain time period to better understand the Customer population.
  - As another example, a Vendor may want to know where all of the Customers that share a certain profile feature(s) (e.g., those that use the system more than 1 time a week or those who earn more than a certain income level) are or were at a given time in order to better position their business near those Customers at a time they may more likely be at that location or in that region
- The server(s) may return to the Vendor a written or graphical report that may include information about Customers that meet their search criteria or a graphical or text summary that indicates where the Customers have been positioned within a defined period of time.
  - For example, this output may take the form of a static map that highlights the locations of the Customers (that meet the search criteria) in a single 24 hour period or on a certain day of the week.
  - Maps may represent many other different views and functions including, but not limited to: 'real time' maps showing where certain Customers are located at the current time (for example, this may benefit a Vendor who wishes to position their business near a high concentration of Customers who have used their product in the past 90 days
  - These requests and related outputs may be further customized to allow for different views
    - These data and outputs would be visible and downloadable to the Vendor and used to make decisions about positioning their business.
- The aforementioned "optimal positioning algorithm" discussed earlier in this document may be used in conjunction with this search to optimize their location to best position relative to those Customers they seek.

11) Customer Search and Identification (for Vendors)

General Description: Vendors may be interested in searching for and distinguishing Customers from each other across certain criteria for the purposes of engaging with them in a unique or custom manner. For example, a Vendor may wish to identify a customer that has previously or currently selected their product category as one of interest (in their profile or during a search) but who has not previously engaged in a transaction with them for the purpose of offering them a coupon or incentive to try their product for the first time. Another example may be that a Vendor may desire to recognize a regular Customer and reward them for their patronage by offering a special discount or other incentive.

Detail:
- Registered Customers are labeled with a unique identifier that distinguishes them from other Registered customers.
  - When logged into the system, the network recognizes their identity and stores it in a table on the server
- Conversely, if a Customer is not logged in or if they are a new user and not registered, they are labeled as a unique non-registered user
  - The network recognizes their identity (via IP address or other method) and stores a unique identifier it in a table on the server and/or on their device or computer (e.g., a cookie)
- Registered Vendors may establish pre-selected criteria in their profile (or enter a new search) to identify and target certain Registered Customers and/or New users/non-registered users.
  - The Vendor criteria for Customers are stored in a table on the server
  - When a Customer that meets the criteria established by the Vendor is identified by the network, the pre-registered information desired to be published by the Vendor is distributed to that Customer or new users/non-registered customer via the electronic distribution method chosen
  - For example, if a Vendor wishes to publish or distribute coupons in a targeted manner only to new users/non-registered customers, the network may distribute coupons to these new users/non-registered customers via a visible button or graphic, text message, e-mail, or other electronic distribution method 12) Ability for Customer to store a Vendor as a "Favorite"

General Description: Customers may wish to save a preferred Vendor as a "favorite" to allow them efficient and quicker access to that Vendors information (such as the Vendor's profile, specials, current location, etc.). Saving a Vendor as a Favorite may be accomplished a number of ways, for example, by simply creating a link (e.g., hyperlink) between the Customer's profile area and the Vendors profile.

Detail:

A registered Customer may locate a registered Vendor and its profile through many methods including, but not limited to manually searching the database for Vendors that meet certain search criteria, by receiving an unsolicited marketing message from the Vendor, etc. Another method may be through a wireless device located at the Vendor location (e.g., a Bluetooth device situated on the counter) that allows a Customer to wave their mobile device in the vicinity and store that vendor as a Favorite (along with storing contact information and/or other business information relating to the Vendor).

If the Customer desires to create a shortcut or quick link to the Vendor's profile, they may initiate a save request through their interface This request is stored in a table on the server and associates the Vendor profile information (e.g., Vendor's unique identifier) with the Customer's profile information.

Manually or automatically this information may be accessed and displayed in the Customers profile, for example in a section called "Favorites"

The Customer may wish to manage their Favorites in a number of ways which may include adding, deleting, sorting or otherwise modifying their Favorites list. Such changes are initiated with a request transferred to the server and stored in a table associated with the Customer's profile.

13) Ability for Vendor to store Customer as a "Favorite"

General Description: Vendors may wish to save a Customer as a "favorite" to allow them efficient and quicker access to that Customer's information (such as the Customer's profile or data regarding their purchasing habits) for a variety of purposes which may include marketing or communications (e.g., distributing information such as new specials or menu items to the Customer). This favorite list (or "Customer List" would allow the Vendor to communicate in a targeted manner (i.e., single Customer on their list), or more broadly (i.e., broadcasting a message to multiple Customers all at the same time).

Saving a Customer as a Favorite may be accomplished a number of ways, for example, by simply creating a link (e.g., hyperlink) between the Vendor's profile area and the Customers profile.

Detail:

A registered Vendor may locate a registered Customer and their profile through many methods including, but not limited to manually searching the database for Customers that meet certain search criteria, by identifying a Customer's profile information off from a marketing data report, or by other methods. Another method may be through a wireless device located at the Vendor location (e.g., a Bluetooth device situated on the counter) that allows a Customer to wave their mobile device in the vicinity and allow the Vendor to store them as a Favorite (by storing their contact information and/or other information relating to the Customer).

If the Vendor desires to create a shortcut or quick link to the Customer's profile, they may initiate a request through their interface This request is stored in a table on the server and associates the Customer profile information (e.g., Customer's unique identifier) with the Vendor's profile information.

Manually or automatically this information may be accessed and displayed in the Vendor's profile, for example in a section called "Favorites" or "Customer List".

The Vendor may wish to manage their Favorites in a number of ways which may include adding, deleting, sorting or otherwise modifying their Favorites list. Such changes are initiated with a request transferred to the server and stored in a table associated with the Vendor's profile.

14) Follower List

General Description: Vendors may wish to access and/or maintain a list of Customers who have saved that vendor their "Favorites" for the purposes of targeted marketing to them given their active interest in the Vendor. When a Customer selects a Vendor to their favorites list, the Customers unique identifier is added to a list accessible to the Vendor. The Vendor may access, download, sort, save, or otherwise manage these data associated with this Customer list for a number of marketing purposes.

Detail:

As described earlier, a registered Customer may initiate a request to save a Registered Vendor as one of their Favorites through a variety of methods.

This request is stored in a table on the server and associates the Vendors information (e.g., Vendor's unique identifier) with the Customer's profile information Manually or automatically this information may be accessed and displayed to the Vendor in the form of a list representing all the Registered Customers that have saved (currently or at some time in the past) the Vendor as one of their favorites.

The Vendor may search the list and generate various outputs that summarize certain subsets of data. For example, the Vendor may wish to generate a list of Customers that have saved them as a Favorite and reside in a certain geographic zone for the purposes of distributing electronic marketing communications to them.

15) Transaction Recognition and History

General Description: Registered Vendors and Customers may desire to track transaction events between them for a variety of purposes including, but not limited to, tracking purchase history and/or awarding and accruing loyalty points, etc.

This tracking may occur automatically and electronically by the network (i.e., if a Customer conducts a transaction electronically this transaction is stored).

Or this tracking may occur manually. For example, if a Customer engages in a transaction with a Vendor, the Customer or Vendor may manually record the transaction in many different ways, including, but not limited to:

The Customer may place their mobile device near an electronic receiver operated by the Vendor in order to record the transaction and accrue points on the spot (such as via Bluetooth connection located on the counter of the Mobile Vendor)

The Vendor may also manually enter the Customer name using their interface

Detail:

Automatic

If a Vendor and Customer engage in an electronic transaction (i.e., the Customer places an order via their mobile device or network interface and pays for the order using an electronic funds transfer method, the transaction may be recorded and stored in the database.

The order would be characterized with a unique identifier. Information about the order including, but not limited to, the time and date, Customer and Vendor unique identification ID, items ordered, price paid, banking information, geographic information about the Vendor or Customer at the time or order, demographic information, etc. may be recorded and associated with the orders unique identifier and would be stored on the server.

The order's unique identifier may be associated with the Vendor and Customer's profiles to allow them to manage the data in certain ways which may include accessing and displaying, sorting, saving, exporting, downloading, etc.

Manual

If a Vendor and Customer engage in an electronic transaction (i.e., the Customer walks up to the vendor and engages in a transaction, the transaction may be recorded and stored in the database.

One method of storing this event may include the Vendor manually entering the Customer's unique identifier into their mobile or network device for the purposes of recording and storing information about the event.

For example, the Vendor may enter the Customer's name or identifier, the type or quantity of the item, the price, etc.

This information, as well as other information which may include the date, time, geographic location of the Vendor, etc. may also be stored.

The data would be entered and uploaded to the server and stored in a table. The data could be associated with the vendor and Customer's profiles for viewing and display, analysis, download, etc.

Another method may be for the Customer to wave their device near a receiver on the counter of the Vendor to record or verify their identify to be associated with the transaction.

Application of Data

The data about the transaction may be visible in the profiles of the Vendor and/or Customer. This would be accomplished by the server displaying the transaction information in the profile of the Vendor or Customer.

The data could be sorted and downloaded by the Vendor or the Customer. This could be conducted by the Vendor or Customer initiating a search or other request to the server. The server would access those transaction records that meet desired search criteria, and the data would then be made visible or available for download to the Vendor or Customer for the purposes of analyzing trends or performing other analytics on the data.

These data could be used for a number of purposes, such as managing a Loyalty or Points program (see below).

16) Loyalty or Points Program

General Description: Registered Vendors and Customers may wish to use tracked or saved transactions (see above section on recording transactions) made between them for the purposes of Vendors conducting loyalty or rewards programs to provide special discounts or incentives to these preferred Customers.

This tracking may occur automatically and electronically by the network (i.e., if a Customer conducts a transaction electronically this transaction is stored).

Or this tracking may occur manually. For example, if a Customer engages in a transaction with a Vendor, the Customer or Vendor may manually record the transaction in many different ways, including, but not limited to:

The Customer may place their mobile device near an electronic receiver operated by the Vendor in order to record the transaction (such as via Bluetooth connection)

The Vendor may manually enter the Customer name using their interface

Detail:

Automatic

If a Vendor and Customer engage in an electronic transaction (i.e., the Customer places an order via their mobile device or network interface and pays for the order using an electronic funds transfer method, the transaction may be recorded and stored in the database.

The order would be characterized with a unique identifier.

Information about the order including, but not limited to, the time and date, Customer and Vendor unique identification ID, items ordered, price paid, banking information, geographic information about the Vendor or Customer at the time or order, demographic information, etc. may be recorded and associated with the orders unique identifier and would be stored on the server.

The order's unique identifier may be associated with the Vendor and Customer's profiles to allow them to manage the data in certain ways which may include accessing and displaying, sorting, saving, exporting, downloading, etc.

Manual

If a Vendor and Customer engage in an electronic transaction (i.e., the Customer walks up to the vendor and engages in a transaction, the transaction may be recorded and stored in the database.

One method of storing this event may include the Vendor manually entering the Customer's unique identifier into their mobile or network device for the purposes of recording and storing information about the event.

For example, the Vendor may enter the Customer's name or identifier, the type or quantity of the item, the price, etc.

This information, as well as other information which may include the date, time, geographic location of the Vendor, etc. may also be stored.

The data would be entered and uploaded to the server and stored in a table. The data could be associated with the vendor and Customer's profiles for viewing and display, analysis, download, etc.

Application of Data

The data about the transaction may be visible in the profiles of the Vendor and/or Customer. This would be accomplished by the server displaying the transaction information in the profile of the Vendor or Customer.

The data could be sorted and downloaded by the Vendor or the Customer. This could be conducted by the Vendor or Customer initiating a search or other request to the server. The server would access those transaction records that meet desired search criteria, and the data would then be made visible or available for download to the Vendor or Customer for the purposes of analyzing trends or performing other analytics on the data.

Redemption of Points

A Customer engaging in a transaction with a Vendor may desire to redeem value associated with their points in order to lower the cost of a transaction. The points may be redeemed in many ways, including, but not limited to:

Manually: A Customer physically engaging in a transaction may redeem their points in multiple ways including, but not limited to:

Waving their mobile device near a device operating by the Vendor in order to allow the device to recognize the Customer and access their Points balance.

The network would recognize the Customer and access information associated with them including a Point balance associated with that Customer and Vendor.

The network may transfer the data to be visualized by the Customer or Vendor.

The Customer or Vendor may select to use a specific amount of Points by using their interface to select the amount.

The amount request is transferred to the server and deducted from the Customer's profile account. These data would be stored on the table on the server.

Automatically: A Customer engaging in an electronic transaction may redeem their points in multiple ways including, but not limited to:

During the order or checkout portion of the electronic order (the order to be later picked up by the Customer at the Vendor's location), the Customer may have access to their Points balance associated with that Vendor (and all others) for which they have a balance).

During the transaction, the Customer may have the option to "apply" or "use points" to lower the price of the transaction.

The Customer may be able to select to use all or a portion of the Points balance and apply it to the order.

This may be executed in the following manner:

The network would recognize the Customer and access information associated with them including a Point balance associated with that Customer and Vendor with which they are engaging in a transaction.

The network may transfer the data to be visualized by the Customer.

The Customer may select to use a specific amount of Points by using their interface to select the amount using a visible button trough their interface.

The amount requested is then transferred to the server and deducted from the Customer's profile account.

The updated balance is stored in the table and made visible to the customer through their profile and interface.

The data in this table may also be linked to the Vendors profile which would allow them to access, view, download, or otherwise manage the Point balances associated with their Customers.

17) Advertising

General Description: Registered Vendors may wish to distribute marketing communications electronically via e-mail, text message, IM, phone, or other transmission method to Registered and Unregistered Customers. These communications may be manually created and pushed or created and distributed via automatic means.

Detail:

A registered Vendor(s) device connects to a server(s) maintained by a service provider(s) and passes the server(s) information about the Vendor that may include, but not be limited to:

Time of day, date, Vendor's name or unique identifier, Vendor's geographic coordinates, Vendor's profile information and other information such as Vendor's usage history, device type or software version, or any other information about the Vendor or their preferences or usage patterns.

A Registered Customer's device connects to a server(s) maintained by a service provider(s) and passes the server(s) information about the Customer that may include, but not be limited to:

Time of day, date, Customer's name or unique identifier, Customer's geographic coordinates, Customer's profile information and other information such as Customer's usage history, device type or software version, or any other information about the Customer or their preferences or usage patterns.

Content Creation

The Registered Vendor may create marketing materials including text, graphics, or other marketing content in an offline fashion (with their local desktop software) and then "upload" this content to their profile area on the server for subsequent management including but not limited to storing, editing and distribution.

The content is stored on the server in a table associated with the Registered Vendors profile.

Alternately, the Registered Vendor may use functionality included on the server to create and manage their marketing content. This may include, but not be limited to text and graphic editing functionality.

Content Distribution

A Registered Vendor may then distribute the marketing content stored on the server to both Registered and non-registered users in a variety of manners including, but not limited to the following:

Banner Advertising: The Registered Vendor may desire to display the marketing content to select or all users, at anytime including to those that have, are, or will use the server in the future). This may be accomplished a number of ways including, but not limited to, displaying the marketing content in an area on the Registered Vendor's profile or in a general area visible to the user.

Text Message to Phone: The Registered Vendor may desire to distribute the marketing content to select or all users (at anytime including to those that have, are, or will use the server in the future). This may be accomplished a number of ways including, but not limited to distributing a text message that is uploaded to the server and then distributed to the Customers directly via the server or via third-party network affiliate(s) to which the Customers telephones are connected.

Instant Message (IM): The Registered Vendor may desire to distribute the marketing content to select or all users (at anytime including to those that have, are, or will use the server in the future). This may be accomplished a number of ways including, but not limited to distributing an IM that is uploaded to the server and then distributed to the Customers directly via the server or via third-party network affiliate(s) (such as Twitter) to which the Customers mobile devices, computers or other devices are connected.

E-mail Message: The Registered Vendor may desire to distribute the marketing content to select or all users (at anytime including to those that have, are, or will use the server in the future). This may be accomplished a number of ways including, but not limited to distributing an e-mail message that is uploaded to the server and then distributed to the Customers directly via the server or via third-party network affiliate(s) (such as Yahoo, Google, etc.) to which the Customers mobile devices, computers or other devices to which they have access are connected.

Other electronic transmission methods to a user: The Registered may use other forms of creating and transmitting electronic data containing marketing content to current or potential Customers including, but not limited to:

Bluetooth transmission to a mobile device that is within the vicinity of the Vendor, this may include both Registered and Un-Registered Customers Wireless transmission (Bluetooth, Wireless network, etc.) to a video display, build board or other method of displaying content to Customers Any other method of transmitting marketing content to a Customer for the purposes of trying to engage in a transaction between the Mobile Vendor and the potential or current Customer.

18) Vendor Ratings and Reports

General Description: Customers may wish to provide feedback ratings about Vendors for the purpose of informing other Customers about the quality of product or service they have experienced by the Vendor. Such ratings may be viewable by Customers and Vendors in a real time manner and/or by generating reports or other summary views that provide ratings about a single or multiple Vendor(s).

Detail:

A Registered Customer may desire to label a Vendor with a rating. This may be accomplished a variety of ways including, but not limited to the following:

The Registered Customer may search for and locate the Vendor's profile on the server and select a hyperlink such as "Rate this Vendor" which would allow them to enter content or rating information about the Vendor and post. Upon posting, the rating data is transferred to the server and stored in a table linked or associated with both the rated Vendor and the Customer conducting the rating.

A Registered Customer may choose to rate a Vendor at the time of being connected with that Vendor through various means such as the Vendor sending marketing materials including IMs, Text Messages, etc. or upon conducting an electronic financial transaction.

Rating data may then be made visible through display in the profile section of the Vendor (perhaps in an aggregated form with other rating data).

Additionally, the data may be accessed by Customers that are searching for Vendors and desire information about Vendor ratings (e.g., they may wish to search for Vendors that have at least 4 out of 5 stars)

19) Acceptance and Processing of Customer Orders

General Description: Registered Customers may engage in electronic financial transactions with Registered Vendors by linking their banking or financial information to their profiles and/or by pre-loading their profile account with funds in order to pay for their orders electronically. While browsing Vendor's profile or online product offering, they may select items for purchase, pay for them, and then walk to the Vendor to pick up their items (or receive it in some other fashion).

Detail:

Registered Customer

Through a Web interface, desktop or mobile device application or other method of interface a Customer (or an Agent) will pre-register with a service provider to create an account and will provide the service provider with data, content and/or uploads which may include, but not be limited to:

Name, e-mail address, address, mobile number, product category preferences, network alert preferences (see Alert feature), a photograph, social network account information, certain demographic data, mobile device type, etc.

The registered Customer may also enter banking or other financial information to allow for electronic transactions.

A Registered Vendor

Through a Web interface, desktop or mobile device application or other method of interface a Vendor (or an agent) will pre-register with a service provider to create an account (profile) and will provide the service provider with various data, content and/or uploads about their business to assist Customers in searching for them, which may include, but not be limited to:

Owner or Business Name, e-mail address, and/or other contact information, Vendor's general product category, specific product listings, price information, business hours, logos, photos, URL to Vendor's Website, downloadable coupons or information on specials, and other Vendor profile information and other business information that describes their products, business, services or other business attributes.

The registered Vendor may also enter banking or other financial information to allow for electronic transactions.

If a customer browsing the network identifies a product of interest to them, they may select that item(s) and enter additional information in support of a transaction (e.g., quantity information, preferred pick up time or location information, etc.)

Their request is passed over the network to the server and stored in a table associated with the Customer.

Upon completing the necessary information to conduct the transaction, the Customers request is transmitted to the server and communicated to the Vendor and any third-party entities required to execute the transaction (e.g., banks or third-party online payment services).

The request and associated information (e.g., transaction IDs, etc.) are stored in tables on the network.

Data is stored in the Vendor Profile on the network and also passed to the Vendor via messaging or other electronic means.

Data associated with this transaction may be stored and accessible to various parties including the Customer, Vendor, service provider, etc.

20) Vendor Transaction Execution

General Description: The system may allow for the conduction of transactions among, between, or on behalf of Vendors and the Network.

For example, a Vendor may desire to purchase a "Premium Vendor Membership" from the Network in order to access enhanced services offered by the Network (e.g., aforementioned 'Customer Hear Maps').

The system will have the ability to allow users to select and electronically purchase items (via CC, EFT, third-party funds transfer, or other any other electronic payment method).

Detail:

A Vendor registers at a basic level with the server. A profile is created and information they provide is uploaded to and stored in a table on the server associated with their profile account.

To purchase a premium membership level, Customer or market intelligence reports, or any other information offered by the system, the Registered Vendor is logged into the system and navigate to the service(s) or products of interest to them.

A registered Vendor(s) device connects to a server(s) maintained by a service provider(s) and passes the server(s) information about the Customer(s) that may include, but not be limited to:
    Time of day, date, Customer's name or unique identifier, Customer's geographic coordinates, Customer's profile information and other information such as Customer's usage history, device type or software version, or any other information about the Customer or their preferences or usage patterns.

These data are stored in a table on a network server(s)

The Vendor may search for and/or view enhanced membership options offered by the Network. This may be presented in the form of an online "menu" of service and membership options.

Should the Vendor desire to purchase a Premium Membership, they may select the option and conduct the transaction in a number of ways including, but not limited to:
    The Registered Vendor may provide banking, credit card, or other financial information and related authorizations to allow for the electronic funds transfer from their accounts to the Network either directly or with the use of Third Party(s).
    This information would be stored in a table on the Network server
    When a Vendor selects an item to purchase, the Vendor's banking information would be accessed and an electronic transfer would occur.

21) Language Versions/Translation

General Description: The system may display content and conduct transactions in multiple languages including, but not limited to English and Spanish.

Detail:
    To accommodate Customers multiple languages, the Customer interfaces may be displayed in languages other than English.
    This may be accomplished by having multiple language packs built into a single software suite that consists of all the Customer interfaces and network systems, or it may be accomplished by offering multiple versions of the software suite that are coded in various languages.
        A Vendor or Customer would select the preferred Language upon download, install, or initial access of the interface.
        A Customer would be able to change their preferences resulting in activation of another language pack or installation of an alternate version of the software suite.
        These preferences would be stored in a table containing their profile information.
    Alternately, language translators may be used to convert English to a preferred language. As content from the server is pushed to Customers or Vendors, their chosen language would be displayed.

22) Customer to Customer Instant Messaging

General Description: The system will allow Customers to communicate with other Registered Customers to allow them to communicate their intent to engage in a business transaction with a particular Vendor(s) for the purposes of inviting the other Registered Customer(s) to join them. For example, a Customer may send an IM to invite a friend to join them to also purchase sushi at mobile food truck currently located nearby.

Detail:
    A registered Customer(s) device connects to a server(s) maintained by a service provider(s) and passes the server(s) information about the Customer(s) that may include, but not be limited to:
        Time of day, date, Customer's name or unique identifier, Customer's geographic coordinates, Customer's profile information and other information such as Customer's usage history, device type or software version, or any other information about the Customer or their preferences or usage patterns.

These data are stored in a table on a network server(s)

A registered Customer may locate and store other Registered Customers as a "Buddy".

They may locate them in a number of ways including, but not limited to, searching for other Customer's e-mail address, phone number or other identifying ID via the network interface.

When the other Customer is identified, the first Customer may store them as a buddy that results in the other Customer's ID being stored in the Customer profile, which is stored in the table on the server.

When a Customer wishes to massage the other Customer to invite them to join in visiting a mobile Vendor, they may do this in a number of manners that may include, but not be limited to, activating a hyperlink that is associated with their Buddy which may send an automated, pre-defined IM to the Customer. In this case, the content associated with the message would be transferred over the server and pushed or distributed to the intend Customers mobile device or other method of interface with the server. A two way communication would then be possible with the server acting as an intermediary and passing the data back and forth. The data would be stored in a table associated with the Customers to allow for later access and/or distribution.

Alternately, the system may allow the Customer to create a text, graphical, or other communication with their mobile device (or other means of accessing the server) and send it to the other Customer. This would be accomplished by the data being transferred to the server and then distributed to the intended Customers mobile device. The data would be stored in a table associated with the Customers to allow for later access and/or distribution.

Unmet Needs

A need exists in the market to more effectively connect customers with mobile vendors like food trucks. Additionally, an opportunity exists to develop a system that records and analyzes vendor and customer information to allow real-time, geospatial market intelligence for vendors and to better connect customers with vendors in real-time.

Overview

Functionality

A system (including hardware tools and custom desktop/smart phone applications) to allow mobile (i.e., roaming) retail vendors and their customers to more effectively connect and conduct business in a real time manner. Industry applications may include, but not be limited to, connecting mobile gourmet food trucks with customers searching for a particular meal option.

One function of the service includes the ability for a customer to access a searchable database to locate trucks that sell items of interest to them and to map their location via GPS-enabled devices to more efficiently find them.

These search data are collected and analyzed to provide precise and real-time market data to vendors including, but not limited to, "heat map" reports of customer searches (with detailed query parameters including their exact locations and time of search) to better position their vehicles near customers seeking their particular services or products.

Additional features to enhance the connectivity between vendor and customer and user experience also include, but are not limited to:
  A positioning algorithm to allow a vendor to optimize their location to limit the distance between the most number of potential customers (optimized geospatial mapping)
  Real time "pokes" to allow customers to try and entice a connected roaming vendor over to their location
  Ability of vendors to issue an electronic coupon to a customer using the system
  See features sections (Vendor and Customer) for additional functionality
Hardware Components
May include, but not be limited to:
At least one GPS-enabled device
  To transmit the vendor's location
GPS locator and tracking system
  A system to collect location (latitude, longitude), timestamp, etc. of an enrolled signal
  E.g., InstaMapper (service that allows you to track a GPS-enabled cell phone online in real time http://www.instamapper.com/)
Desktop Computer
  For customer to conduct searches and produce vendor maps, manage their accounts, etc.
  For vendors to access their business profile, manage their account, etc.
Smart Phone
  For customer to conduct searches and produce vendor maps, manage their accounts, etc.
  For vendors to access their business profile, manage their account, etc.
Network-Accessed Server
  Store vendor data
  tore customer search data
  Perform analytics
  Run reports (e.g., heat maps, etc.)
  Etc.
Software Components
May include, but not be limited to:
A searchable database
  To allow customers to search, access and locate vendors
  To allow vendors to search and access customer data (including search data)
Analytics/Algorithms
  Customer software to perform analytics, prepare reports, etc.
  See features sections (Vendor and Customer) for additional functionality
Website
  For vendors to access their business profile, manage their account, etc.
  For customer to conduct searches and produce vendor maps, manage their accounts, etc.
Smart Phone Application(s)
  For vendors to access their business profile, manage their account, etc.
  For customer to conduct searches and produce vendor maps, manage their accounts, etc.
Revenue Model
Multiple revenue streams could result from this system, including but not limited to:
  Monthly vendor membership fees
  Custom reports and data sales to vendors
  Report and data sales to industry Transaction revenue (if equipped with online ordering feature)
  Banner advertising
Vendor Features—Additional Detail
May include, but not be limited to:
Website and mobile application option
Ability to turn on or off their location signal (i.e., be open for business, closed for business)
Profile
  Basics
    Name, logo
    Food type
    Menu
    URL to Website
    Reader comments
    Ratings
    Etc.
  Follower List
  Loyalty or points program
  Get ratings by customers
  Manage daily specials
    E-Coupons (alter amount: 10%, 20%, 30%, new customers only, or turn off real time)
    Discounts
    Etc.
Market Data
  Geo and time-based search result reports
    For their subscribed food type
    For other food types if they want to explore expanding their menu offering
    Monthly, weekly, daily, hourly, real time reports
  Algorithm to optimize location
    Maximizes number of people while minimizing average walk
Ability to accept orders and payment for item(s) via customer accounts (pre-loaded with funds)
Example Pricing for Illustration only

| Level | Features | Example Pricing |
|---|---|---|
| Listed | Included in database | Free |
| Basic | Monthly report, coupons (200) | $9.95 month |
| Weekly | Weekly report, coupons (400) | $14.95 month |
| Premium | Hourly report, coupons (unlimited), real-time pokes | $24.95 month |
| "A la Carte" | | |
| 30 Day report | Last 30 day report (Listed) | $9.95 each |
| 7 Day report | Last 7 days report (Listed, Basic) | $7.95 each |
| 1 Hour report | Last 1 Hour report (Listed, Basic, Weekly) | $4.95 each |
| Coupons | Batch of 200 (Listed, Basic, Weekly) | $4.95 each |
| Banner Ad | Appear when someone searches for that type | Bid system |

Customer Features
May include, but not be limited to:
Language versions could include, but not be limited to:
  English
  Spanish
Website and mobile application option (free)
Real time searching
Ability to store favorites
Ability to "Poke" vendors—encourage them to drive to their area Set alerts to monitor any vendors that pass within their area within pre-define parameters
Turn on or off, modify
Select a food type
Establish a time window to monitor
Special notifications
Monitor their favorite trucks
Etc.
Tweet or send messages to their contacts (i.e., does anybody want to join me at truck X in 5 minutes?)
Ability to rate trucks
Ability to order and pay for item(s) with their account (via a pre-loaded account with funds)
Etc.

Those skilled in the art will recognize improvements and modifications to the embodiments of the present disclosure. All such improvements and modifications are considered within the scope of the concepts disclosed herein and the claims that follow.

What is claimed is:

1. A method for directing a vendor vehicle associated with a vendor to an area in a region, comprising:
    receiving, by a device, a plurality of search requests from a plurality of corresponding user devices, each search request comprising search request data that includes a location identifier that identifies a location of the corresponding user device in the region at a time of the search request, and one or more user search criteria;
    identifying, based on the plurality of search requests and at least one subset-determination criterion, at least one subset of the plurality of corresponding user devices;
    determining, by the device, at least one determined location within the region based on the corresponding locations of the user devices in the at least one subset; and
    sending vehicle positioning information that identifies the at least one determined location to a vendor device associated with the vendor vehicle.

2. The method of claim 1, wherein the vendor device is in the vendor vehicle.

3. The method of claim 1, wherein the vendor device is located in a place of business of the vendor.

4. The method of claim 1, further comprising:
    determining, based on the locations of the user devices in the at least one subset, a preferred determined location that is located about equidistant to each of the locations of the user devices in the at least one subset; and
    wherein sending the vehicle positioning information that identifies the at least one determined location to the vendor device associated with the vendor vehicle comprises sending the vehicle positioning information that identifies the preferred determined location to the vendor device associated with the vendor vehicle.

5. The method of claim 1, further comprising:
    receiving, from the vendor device, a request for the vehicle positioning information, and wherein sending the vehicle positioning information that identifies the at least one determined location to the vendor device associated with the vendor vehicle comprises sending the vehicle positioning information that identifies the at least one determined location to the vendor device associated with the vendor vehicle in response to the request.

6. The method of claim 1, further comprising:
    accessing, by the device, vendor data identifying one or more vendor devices, including the vendor device; and
    wherein sending the vehicle positioning information that identifies the at least one determined location to the vendor device associated with the vendor vehicle comprises, based on the vendor data, automatically sending the vehicle positioning information that identifies the at least one determined location to the vendor device associated with the vendor vehicle.

7. The method of claim 6, wherein based on the vendor data, automatically sending the vehicle positioning information that identifies the at least one determined location to the vendor device associated with the vendor vehicle further comprises:
    based on the vendor data, automatically sending the vehicle positioning information that identifies the at least one determined location to a plurality of vendor devices.

8. The method of claim 1, further comprising:
    receiving, from the vendor device, a vendor search request comprising the at least one subset-determination criterion.

9. The method of claim 1, wherein the at least one subset-determination criterion comprises a user device density that identifies a number of user devices, and an area within which the number of user devices are located.

10. The method of claim 1, wherein the at least one subset-determination criterion comprises a product type criterion.

11. The method of claim 10, wherein the product type criterion identifies a type of food.

12. The method of claim 1, wherein the vehicle positioning information comprises a map of the region, and the at least one determined location comprises the area in the region, wherein the map visually distinguishes the area in the region from every other area in the region.

13. The method of claim 1, further comprising:
    accessing a user trigger associated with a user that identifies at least one user trigger criterion, the at least one user trigger criterion comprising a distance from a location of the user device corresponding to the user;
    determining that a current location of the vendor vehicle is within the distance; and
    in response to determining that the current location of the vendor vehicle is within the distance, sending vendor vehicle alert information to the user device corresponding to the user that indicates the current location of the vendor vehicle.

14. The method of claim 13, wherein the at least one user trigger criterion further comprises a particular product type;
    determining that the vendor vehicle sells the particular product type; and
    wherein in response to determining that the current location of the vendor vehicle is within the distance, sending the vendor vehicle alert information to the user device corresponding to the user that indicates the current location of the vendor vehicle further comprises:
    in response to determining that the current location of the vendor vehicle is within the distance and the vendor vehicle sells the particular product type, sending the vendor vehicle alert information to the user device corresponding to the user that indicates the current location of the vendor vehicle.

15. The method of claim 13, further comprising:
    sending to the user device corresponding to the user an electronic coupon that offers a discount on a product sold via the vendor vehicle.

16. The method of claim 13 further comprising receiving a location update message from the vendor device that identifies the current location of the vendor vehicle.

17. The method of claim 1, further comprising:
    receiving, from at least one user device of the plurality of corresponding user devices poke information that identifies the location of the at least one user device and a vendor identifier associated with the vendor device; and in response to receiving the poke information, sending, to the vendor device, a poke message that identifies the location of the at least one user device.

18. The method of claim 17, further comprising:

accessing a user profile that comprises a plurality of user attributes of a user associated with the at least one user device; and wherein the poke message further comprises at least one user attribute of the plurality of user attributes.

19. The method of claim 1, further comprising:

in response to at least one search request of the plurality of search requests, accessing a plurality of vendor profiles, each vendor profile comprising vendor data associated with a respective vendor;

identifying at least one vendor profile of the plurality of vendor profiles based on a match between a user search criterion of the at least one search request and vendor data of the at least one vendor profile;

determining a current location of a vendor vehicle associated with the at least one vendor profile; and sending the current location of the vendor vehicle to the corresponding user device.

20. The method of claim 19 further comprising:

identifying a plurality of vendor profiles including the at least one vendor profile based on the match between the user search criterion of the at least one search request and vendor data of the plurality of vendor profiles;

determining current locations of vendor vehicles associated with the plurality of vendor profiles; and sending the current locations of the vendor vehicles to the corresponding user device.

21. The method of claim 1, further comprising:

accessing coupon information associated with the vendor; and sending, to a user device of the plurality of corresponding user devices, the coupon information.

22. A device, comprising:

a communication interface configured to communicate with a network; and a processor coupled to the communication interface, and configured to:

receive a plurality of search requests from a plurality of corresponding user devices, each search request of the plurality of search requests comprising search request data that includes a location identifier that identifies a location of a corresponding user device of the plurality of corresponding user devices in a region at a time of the each search request, and one or more user search criteria;

identify, based on the plurality of search requests and at least one subset-determination criterion, at least one subset of the plurality of corresponding user devices;

determine at least one determined location within the region based on corresponding locations of user devices in the at least one subset; and send vehicle positioning information that identifies the at least one determined location to a vendor device associated with a vendor vehicle.

* * * * *